(12) United States Patent
Futahashi et al.

(10) Patent No.: US 10,584,675 B2
(45) Date of Patent: Mar. 10, 2020

(54) UNDERWATER FLOATING-TYPE OCEAN CURRENT POWER GENERATION DEVICE

(71) Applicant: MITSUBISHI HEAVY INDUSTRIES, LTD., Tokyo (JP)

(72) Inventors: Kensuke Futahashi, Tokyo (JP); Sho Onodera, Tokyo (JP); Shin Asano, Tokyo (JP); Tetsuhei Kobayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 379 days.

(21) Appl. No.: 15/523,085

(22) PCT Filed: Oct. 20, 2015

(86) PCT No.: PCT/JP2015/079566
§ 371 (c)(1),
(2) Date: Apr. 28, 2017

(87) PCT Pub. No.: WO2016/067971
PCT Pub. Date: May 6, 2016

(65) Prior Publication Data
US 2017/0314525 A1    Nov. 2, 2017

(30) Foreign Application Priority Data
Oct. 29, 2014 (JP) .................................. 2014-219942

(51) Int. Cl.
*F01D 25/28* (2006.01)
*F03B 13/10* (2006.01)
(Continued)

(52) U.S. Cl.
CPC .............. *F03B 13/10* (2013.01); *F03B 13/26* (2013.01); *F03B 15/00* (2013.01); *F03B 17/061* (2013.01);
(Continued)

(58) Field of Classification Search
CPC ....... Y02E 10/28; Y02E 10/38; Y02E 10/725; F03B 13/264; F03B 13/10; F05B 2240/97; F05B 2240/917
(Continued)

(56) References Cited

U.S. PATENT DOCUMENTS 6,091,161 A * 7/2000 Dehlsen ................... B63G 8/18
290/43
6,923,622 B1 * 8/2005 Dehlsen ................. F03B 17/061
416/101

(Continued)

FOREIGN PATENT DOCUMENTS

JP    2010-531956    9/2010
JP    2014-5766 A    1/2014
(Continued)

OTHER PUBLICATIONS

International Search Report dated Jan. 26, 2016, issued in counterpart International Application No. PCT/JP2015/079566 (2 pages).
(Continued)

*Primary Examiner* — Long T Tran
*Assistant Examiner* — James J Kim
(74) *Attorney, Agent, or Firm* — Westerman, Hattori, Daniels & Adrian, LLP

(57) ABSTRACT

Provided is an underwater floating-type ocean current power generation device whereby cyclical directional vibration of a floating body of the ocean current power generation device, caused by shadow moment, can be suppressed. An underwater floating type ocean current power generation device includes ocean current power generation device main bodies, each including a rotor of a power generator housed in a nacelle, and a structure. The rotor is configured to be driven by a rotary blade protruding outward from the nacelle. A twin drum floating body capable of floating (Continued)

underwater is constituted by the structure and the ocean current power generation device main bodies joined to the left and right of the structure. The underwater floating type ocean current power generation device is moored to an ocean floor by a mooring rope.

18 Claims, 11 Drawing Sheets

(51) Int. Cl.
 *F03B 13/26* (2006.01)
 *F03B 15/00* (2006.01)
 *F03B 17/06* (2006.01)

(52) U.S. Cl.
 CPC ..... *F05B 2240/97* (2013.01); *F05B 2270/101* (2013.01); *F05B 2270/20* (2013.01); *Y02E 10/28* (2013.01); *Y02E 10/38* (2013.01)

(58) Field of Classification Search
 USPC .......................................... 415/7; 290/43, 54
 See application file for complete search history.

(56) References Cited

U.S. PATENT DOCUMENTS

| | | | |
|---|---|---|---|
| 8,237,304 B2 | 8/2012 | Dehlsen et al. | |
| 9,816,479 B2* | 11/2017 | Handa | F03B 13/264 |
| 2010/0181774 A1 | 7/2010 | Dehlsen et al. | |
| 2013/0106105 A1* | 5/2013 | Dehlsen | F03B 17/061 |
| | | | 290/43 |
| 2016/0017859 A1 | 1/2016 | Handa et al. | |
| 2016/0201641 A1* | 7/2016 | Handa | F03B 13/264 |
| | | | 290/43 |
| 2018/0038339 A1* | 2/2018 | Umeda | F03B 15/00 |

FOREIGN PATENT DOCUMENTS

| | | |
|---|---|---|
| JP | 2014-159750 A | 9/2014 |
| JP | WO2014/163141 A1 | 2/2017 |

OTHER PUBLICATIONS

Office Action dated Nov. 7, 2017, issued in counterpart Japanese Application No. 2014-219942, with English translation (4 pages).
Office Action dated Sep. 10, 2018, issued in counterpart Chinese application No. 2015800586523, with English translation. (12 pages).
Notification of Transmittal of Translation of the International Preliminary Report on Patentability (Form PCT/IB/338) issued in counterpart International Application No. PCT/JP2015/079566 dated May 11, 2017, with Forms PCT/IB/373 and PCT/ISA/237. (6 pages).

* cited by examiner

OCEAN CURRENT

OCEAN CURRENT

UNDERWATER FLOATING-TYPE OCEAN CURRENT POWER GENERATION DEVICE

TECHNICAL FIELD

The present invention relates to an ocean current power generation device that generates power using ocean current energy. The present invention particularly relates to an underwater floating type ocean current power generation device used by floating a power generation device underwater.

BACKGROUND ART

In recent years, power generation technology using various types of natural energy have been developed. For example, huge ocean currents such as the Japan Current (Kuroshio) are energy resources, and ocean current power generation devices have been developed that generate power using this ocean current energy. With such ocean current power generation devices, power is generated as a result of rotary blades being rotated by the ocean current energy and a power generator connected to the shaft of the rotary blades being rotated.

One system of such an ocean current power generation device is an underwater floating type ocean current power generation device (submerged floating type ocean current power generation device), an example of which is described in Patent Document 1. This underwater floating type ocean current power generation device has a configuration in which an ocean current power generation device, configured as a floating body having a degree of buoyancy, is connected to a mooring line extending from the sea floor and, as a result, generates power by the ocean current power generation device being made to float underwater within a range allowed by the mooring line. With this underwater floating type ocean current power generation device, there is no need for huge support pillars such as those used in wind power generation devices installed on land, and a simple configuration can be achieved.

FIG. 14 is a perspective view illustrating the underwater floating type ocean current power generation device described in Patent Document 1. As illustrated in FIG. 14, this underwater floating type ocean current power generation device is configured as a floating body 1 and, a twin drum model is utilized to stabilize the posture of the floating body 1. Specifically, one floating body 1 is constituted from two ocean current power generation device main bodies 2, 2 and a structure 3 connecting these main bodies 2, 2. Each ocean current power generation device main body 2 is provided with a power generator (not illustrated) within a nacelle 4 (also called a "pod"), and a rotating shaft of a rotating blade 5 is connected to the rotor of this power generator.

The nacelle 4 is joined to each left and right end of the structure 3. A front end of a mooring line 6 is attached to a center in the horizontal direction of the structure 3, and a base end of the mooring line 6 is moored to the ocean floor. The floating body 1 floats underwater in a horizontal direction and a vertical direction within the range restrained by the mooring line 6. The buoyancy of the floating body 1 is balanced on the left and right, and the structure 3 of the floating body 1 is formed in an airfoil shape that faces the ocean current direction. As such, the floating body 1 changes direction depending on the ocean current so that the front face of the floating body 1 (the front face of the rotary blades 5) directly faces the ocean current direction. Thus, power is generated.

Additionally, this ocean current power generation device uses a downwind system in which the rotary blades 5 are disposed behind (on the downstream side of the ocean current) the nacelle 4. By disposing the rotary blades 5 farther to the downstream side than the nacelle 4 in this manner, it is easier to orient the front face of the floating body 1 (the front face of the rotary blades 5) in the ocean current direction. With underwater floating type ocean current power generation devices, it is difficult to implement a drive device for actively performing directional control of the floating body 1 (control to adjust the rotor rotating shaft in the direction of the ocean current). As such, in addition to utilizing a downwind system, a configuration is used in which shapes of the nacelle 4 and structure 3 of the floating body 1 are formed so as to be oriented in the ocean current direction, thus passively orienting the front face direction of the floating body 1 in the ocean current direction.

Additionally, the floating body 1 (the ocean current power generation device) moored by the mooring line 6 floats underwater but, at this time, the floating body 1 assumes a position where the acting force of the ocean current applied to the floating body 1, the buoyancy occurring in the floating body 1, and the tension of the mooring line 6 are balanced. In other words, buoyancy acts vertically upward on the floating body 1, the acting force of the ocean current acts in the ocean current direction (the horizontal direction) on the floating body 1, and the tension of the mooring line acts to oppose the buoyancy and the force of the ocean current. Accordingly, if the acting force of the ocean current is weak (that is, if the current velocity of the ocean current is low), the floating body 1 will rise to a comparatively shallow depth underwater, and if the force of the ocean current is strong (that is, if the current velocity of the ocean current is high) the floating body 1 will sink to a depth comparatively deep underwater.

On the other hand, in a current velocity distribution in the depth direction of the ocean current near the ocean floor, the current velocity is lower the closer the ocean current is to the ocean floor and higher the farther the ocean current is away from the ocean floor. As such, if the current velocity of the ocean current is strong, the floating body 1 will sink underwater and regain balance at a depth where the current velocity has suitably weakened in the current velocity distribution in the depth direction. Moreover, if the current velocity of the ocean current is weak, the floating body 1 will rise underwater and regain balance at a depth where the current velocity has suitably strengthened in the current velocity distribution in the depth direction.

Patent Document 1 focuses on the rising and sinking of the ocean current power generation device depending on the current velocity as described above, and recites that active depth control is made unnecessary due to the application of control whereby the position in the water depth direction of the ocean current power generation device is passively automatically adjusted (also referred to as "Passive Depth Control" or "PDC").

CITATION LIST

Patent Document

Patent Document 1: US Patent Application Publication No. 2013/0106105

SUMMARY OF INVENTION

Technical Problem

As described above, with underwater floating type ocean current power generation devices, as illustrated in FIG. 14, it is preferable to use a twin drum model to stabilize the posture of the floating body 1. Specifically, it is preferable to configure one floating body 1 by connecting two ocean current power generation device main bodies 2, 2 by a structure 3. Additionally, it is preferable to utilize a downwind system in which the rotary blades 5 are disposed behind (on the downstream side of the ocean current) the nacelle 4 in order to orient the front face of the floating body 1 (the front face of the rotary blades 5) in the ocean current direction without requiring a special device.

When a twin drum model is utilized for the floating body 1, obviously the floating body 1 is preferably configured in a symmetrical manner and, as illustrated by the hollow white arrow in FIG. 16A, the floating body 1 is preferably configured such that the acting force of the ocean current (thrust force) applied to the left and right rotary blades 5 is constantly equal.

However, when a downwind system is utilized in a floating body 1 utilizing a twin drum model, as illustrated in FIG. 15, the structure 3 exists in a portion of the inflow region of ocean current of the front face of the rotary blades 5. Consequently, a shadow region of the structure is produced behind the structure 3 that lowers the current velocity. When the blades 5a of the rotary blades 5 pass through the shadow region of the structure 3, the thrust force of the ocean current applied to the blades 5a declines.

If only the thrust force on the blades 5a of one of the left and right rotary blades 5 declines, as illustrated by the black arrows in FIG. 16B, the balance of the thrust force applied to the left and right of the floating body 1 will be lost and, as illustrated by the white hollow arrow in FIG. 16C, a moment M will be created in the floating body 1. This moment may be created in any direction of the roll, pitch, and yaw, depending on the timing of the change in thrust force. Note that the moment that is created as a result of the thrust force becoming unbalanced when the blades 5a pass through the shadow region of the structure is referred to as a "shadow moment", and the shadow region of the structure that causes the shadow moment is referred to as a "shadow moment region".

When shadow moments are alternately created in an offset manner in the left and right rotary blades 5, the floating body 1 becomes unbalanced, and cyclical vibration is generated in the floating body 1. The generation of such vibration in the floating body 1 is a cause of damage to the structure of the floating body, the blades, the mooring lines, and the like. Therefore, this vibration generation is required to be reduced. These problems would not occur if single drum upwind systems (systems in which the rotary blades 5 are disposed in front, which is on the upstream side of the flow of the fluid, of the nacelle 4) that are mainstream in wind power generation devices could be used in ocean current power generation devices because shadow moments would not be created. Accordingly, the problem at hand can be said to be specific to ocean current power generation devices and particularly to underwater floating type ocean current power generation devices.

In light of the problems described above, an object of the present invention is to provide an underwater floating type ocean current power generation device whereby cyclical directional vibration of a floating body of an ocean current power generation device, caused by shadow moments, can be suppressed.

Solution to Problems (1) To achieve the object described above, an underwater floating type ocean current power generation device of the present invention used in a state in which a middle portion of the left and right of a structure is moored in an ocean floor by a mooring rope includes ocean current power generation device main bodies and a structure. The ocean current power generation device main bodies each include a rotor of a power generator housed inside a nacelle. The rotor is configured to be driven by a rotary blade protruding outward from the nacelle. In such a device, a floating body utilizing a twin drum model and capable of floating underwater is constituted by the structure and the ocean current power generation device main bodies joined to the left and right of the structure. Additionally, each of the ocean current power generation device main bodies uses a downwind system in which the rotary blade is disposed farther to a downstream side in an ocean current direction than the nacelle; and each of the ocean current power generation device main bodies includes moment suppression means configured to suppress moments that are created in the floating body as a result of a reduction in thrust force accompanying reduced current velocity of ocean current that occurs when a blade of the rotary blade enters a shadow region (shadow moment region) of the structure on an upstream side in the ocean current direction. Note that herein, the term "moment" includes moments in any direction of the roll, pitch, and yaw.

(2) The moment suppression means are preferably thrust force reduction suppression means configured to suppress reductions in the thrust force of the ocean current that occur when the blade enters the shadow region of the structure.

(3) The thrust force reduction suppression means are preferably configured to suppress reductions in thrust force by increasing a rotational speed of the rotary blade rotor in accordance with reduced current velocity of the ocean current that occur when the blade enters the shadow region of the structure.

(4) The moment suppression means are preferably rotational phase control means configured to control a rotational phase of the blade so that the blade of the rotary blade of each of the ocean current power generation device main bodies joined to the left and right of the structure synchronize and enter the shadow region of the structure.

(5) The rotational phase control means are configured to control the rotational phase of the blade so that the rotational phase of the blade of the rotary blade of one of the ocean current power generation device main bodies joined to the left and right of the structure is set as a reference phase, and the rotational phase of the rotary blade of the other ocean current power generation device main body of the ocean current power generation device main bodies conforms to and synchronizes with the reference phase.

(6) The rotational phase control means are preferably configured to control the rotational phase of the blade of the rotary blade of each of the ocean current power generation device main bodies joined to the left and right of the structure on the basis of a preset reference phase.

(7) The reference phase is preferably set on the basis of a target rotational speed of the rotor of the power generator.

(8) The thrust force reduction suppression means preferably include a blade rotation area determination unit configured to determine whether or not the blade has entered the shadow region of the structure, a target rotation control unit configured to, in cases where the blade has not entered the shadow region of the structure, control a rotational speed of the blade to a target rotational speed, and a rotation increase control unit configured to, in cases where the blade has entered the shadow region of the structure, set a thrust force reduction suppression rotational speed of the blade that is rotationally increased and capable of suppressing reductions in the thrust force caused by reduced current velocity of the ocean current, and control the rotational speed of the blade to the thrust force reduction suppression rotational speed.

(9) The rotational phase control means preferably include an angular phase difference computation unit configured to calculate a phase difference between the reference phase and a rotational phase of the blade subject to control, an angular phase difference determination unit configured to determine, from the phase difference that is calculated, whether or not the rotational phase of the blade subject to control is in a synchronized state with the reference phase, a synchronization hold control unit configured to hold the synchronized state when determined to be in the synchronized state, and a phase difference reduction control unit configured to perform control and reduce the phase difference to a phase difference indicating the synchronized state when determined not to be in the synchronized state.

(10) In a control method for an underwater floating type ocean current power generation device of the present invention, the underwater floating type ocean current power generation device used in a state in which a middle portion of a structure is moored in an ocean floor by a mooring rope includes ocean current power generation device main bodies and a structure. The ocean current power generation device main bodies each include a rotor of a power generator housed inside a nacelle. The rotor is configured to be driven by a rotary blade protruding outward from the nacelle. In such a device, a floating body utilizing a twin drum model and capable of floating underwater is constituted by the structure and the ocean current power generation device main bodies joined to the left and right of the structure. Additionally, each of the ocean current power generation device main bodies uses a downwind system in which the rotary blade is disposed farther to a downstream side in an ocean current direction than the nacelle. The control method includes performing moment suppression processing to suppress moments that are created in the floating body as a result of a reduction in thrust force accompanying reduced current velocity of ocean current that occurs in a shadow region of the structure when a blade of the rotary blade enters the shadow region of the structure on an upstream side in the ocean current direction.

(11) The moment suppression processing is preferably performed by suppressing reductions in the thrust force of the ocean current in the shadow region that occur when the blade enters the shadow region of the structure.

(12) The suppressing of reductions in the thrust force is preferably performed by increasing a rotational speed of the rotary blade in accordance with the reduced current velocity of the ocean current in the shadow region that occurs when the blade enters the shadow region of the structure.

(13) The moment suppression processing is preferably performed by controlling a rotational phase of the blade so that the blade of the rotary blade of each of the ocean current power generation device main bodies joined to the left and right of the structure synchronize and enter the shadow region of the structure.

(14) The controlling of the rotational phase is preferably performed by setting the rotational phase of the blade of the rotary blade of one of the ocean current power generation device main bodies joined to the left and right of the structure as a reference phase, and conforming and synchronizing the rotational phase of the blade of the rotary blade of the other ocean current power generation device main body of the ocean current power generation device main bodies with the reference phase.

(15) Alternatively, the controlling of the rotational phases is preferably performed by controlling the rotational phases of the blades of the rotary blades of each of the ocean current power generation device main bodies joined to the left and right of the structure on the basis of a preset reference phase.

(16) The reference phase is preferably set on the basis of a target rotational speed of the rotor of the power generator.

(17) The suppressing of reductions in the thrust force preferably includes determining whether or not the blade has entered the shadow region of the structure, and when it is determined that the blade has not entered the shadow region of the structure, controlling a rotational speed of the blade to a target rotational speed, and when it is determined that the blade has entered the shadow region of the structure, setting a thrust force reduction suppression rotational speed of the blade that is rotationally increased such that the reductions in the thrust force caused by reduced current velocity of the ocean current can be suppressed, and controlling the rotational speed of the blade to the thrust force reduction suppression rotational speed.

(18) The controlling of the rotational phase preferably includes calculating a phase difference between the reference phase and a rotational phase of the blade subject to control, determining, from the phase difference that is calculated, whether or not the rotational phase of the blade subject to control is in a synchronized state with the reference phase, holding the synchronized state when determined to be in the synchronized state, and performing control and reducing the phase difference to a phase difference indicating the synchronized state when determined not to be in the synchronized state.

Advantageous Effects of Invention

According to the present invention, the moment suppression means suppress moments created in the floating body by reductions in the thrust force caused by reduced current velocity of the ocean current that occurs when the blade of the rotary blade enters the shadow region of the structure on the upstream side in the ocean current direction. As such, the generation of cyclical vibration of the floating body caused by these moments can be suppressed. If this vibration is generated, the structure of the floating body, the blades, the mooring lines, and the like may be damaged, but this is avoided.

As a specific technique for suppressing such moments, if a technique is applied in which the reductions themselves in the thrust force of the ocean current that occur when the blade enters the shadow region of the structure are suppressed, the generation of cyclical vibration in the floating body can be suppressed while independently controlling the left and right rotary blades. In this case, for example, if the rotary blades are operated so as to increase the rotational speed of the rotor rotary blades in accordance with the reduced current velocity of the ocean current that occurs when the blade enters the shadow region of the structure, the reductions in the thrust force corresponding to the reduced current velocity can be canceled out by the increase in the thrust force corresponding to the increased rotational speed of the rotor rotary blades. Thus, the reductions themselves in the thrust force can be reliably suppressed.

Additionally, as a specific technique for suppressing the moments, if a technique is applied in which the rotational phases of the blades are controlled so that the blade of the rotary blade of each of the left and right ocean current power generation device main bodies synchronize and enter the shadow region of the structure, thereby causing reductions in the left and right thrust force to simultaneously occur, the creation of moments can be suppressed even while the thrust force is reduced, and the generation of cyclical vibration in the floating body can be suppressed. In this case, for example, a configuration may be used in which the rotational phase of the blade of the rotary blade of one of the left and right ocean current power generation device main bodies is set as a reference phase, and the rotational phase of the rotary blade of the other ocean current power generation device main body of the ocean current power generation device main bodies conforms to and synchronizes with the reference phase; or a configuration may be used in which the rotational phases of the blades of the rotary blades of each of the left and right ocean current power generation device main bodies is controlled on the basis of a preset reference phase. Additionally, if the reference phase is set on the basis of a target rotational speed of the rotor of the power generator, it is possible to efficiently obtain power generating capacity.

BRIEF DESCRIPTION OF DRAWINGS

FIG. 4A is a drawing illustrating a relationship between thrust force and current velocity. FIG. 4B is a drawing illustrating a relationship between thrust force and rotational speed of a rotary blade.

FIG. 8A relates to a rotation speed (rotational speed) of the rotary blade. FIG. 8B relates to the thrust force.

FIG. 9A is a configuration diagram illustrating a relationship between two ocean current power generation device main bodies. FIG. 9B is a block diagram illustrating the control system.

FIG. 16A illustrates a normal state. FIG. 16B illustrates a state where a moment has been created. FIG. 16C illustrates the behavior of the floating body caused by the creation of the moment.

DESCRIPTION OF EMBODIMENTS

Figure 1:
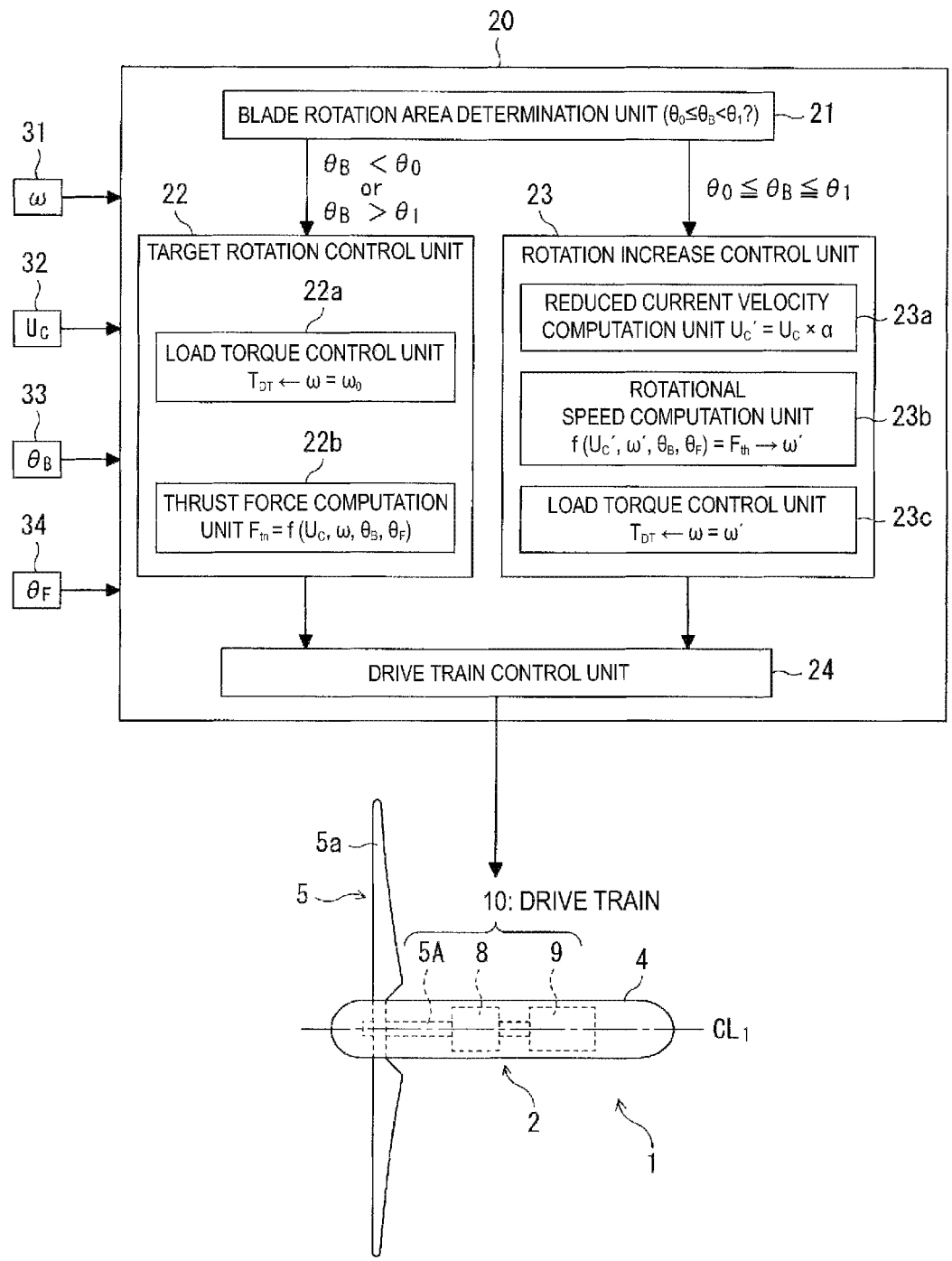
FIG. 1 is a configuration diagram illustrating a control system of an underwater floating type ocean current power generation device according to a first embodiment.

Embodiments according to the present invention will be described while referring to the drawings. Note that the embodiments are mere examples and should not be construed to exclude the application of various modifications or techniques that are not described in the embodiments. The individual features of the embodiments may be modified in various manners without departing from the gist and/or selectively employed as necessary or properly combined with one another.

Figure 14:
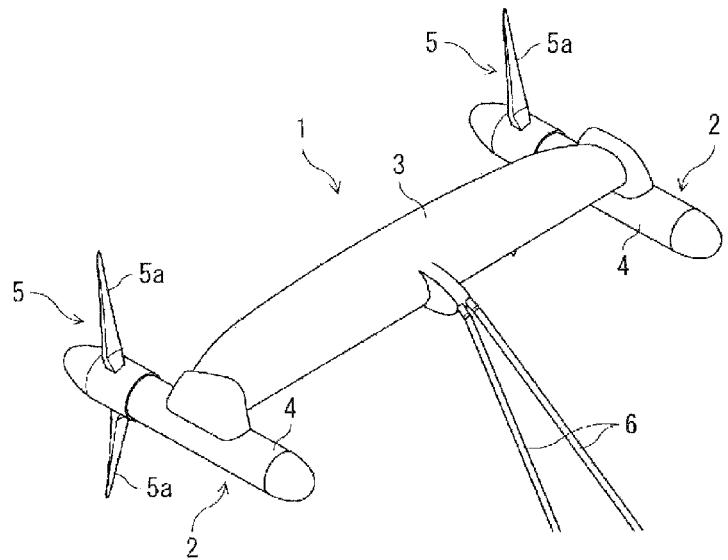
FIG. 14 is a perspective view illustrating an underwater floating type ocean current power generation device according to the background art.
Figure 15:
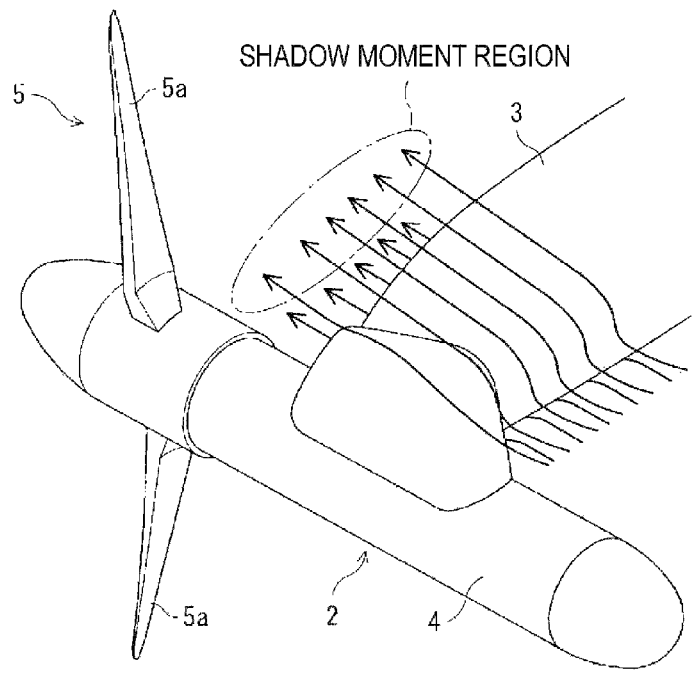
FIG. 15 is a perspective view of the main constituents of an underwater floating type ocean current power generation device for explaining the problems related to underwater floating type ocean current power generation devices.
Figure 16A:
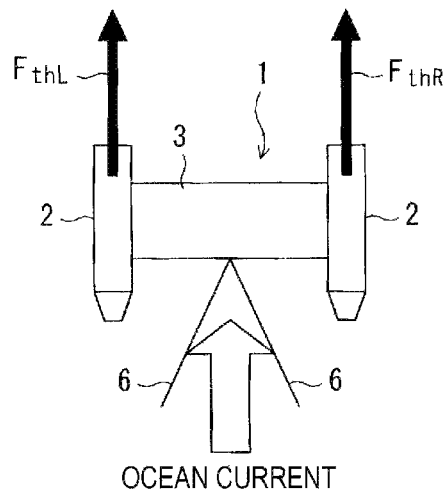
FIGS. 16A to 16C are plan views of an underwater floating type ocean current power generation device for explaining the problems related to underwater floating type ocean current power generation devices.
Figure 16B:
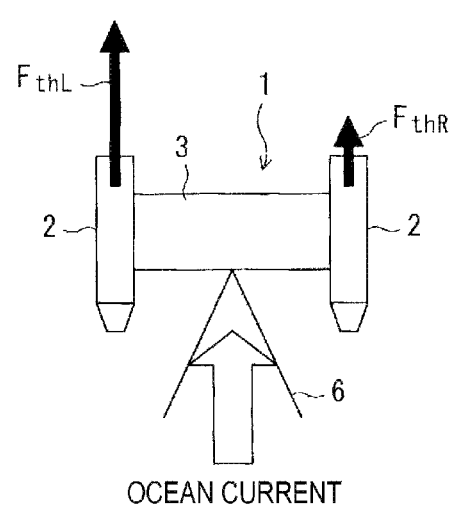
Figure 16C:
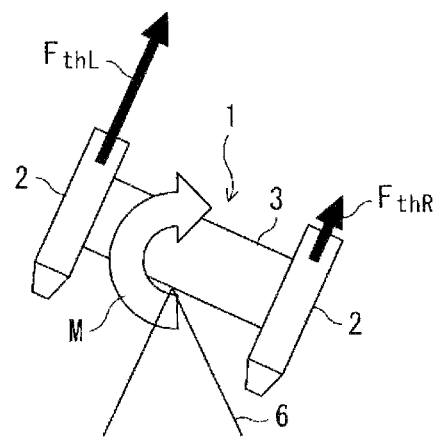

Schematic Configuration of Underwater Floating-Type Ocean Current Power Generation Device of the Embodiments First, a schematic configuration of an underwater floating type ocean current power generation device of the embodiments is described. Specifically, in overview, the underwater floating type ocean current power generation device is the same as that described in the background art (see FIG. 14). At the risk of being redundant, this underwater floating type ocean current power generation device is configured as a floating body 1 and, as illustrated in FIG. 2, a twin drum model is utilized in which one floating body 1 is constituted from two ocean current power generation device main bodies 2, 2 and a structure 3 connecting these main bodies 2, 2. Each ocean current power generation device main body 2 is provided with a power generator 9 within a nacelle 4 (also called a "pod"), and a rotating shaft 5A of a rotary blade 5 is connected to the rotor of this power generator 9 (see FIGS. 1 and 9B).

The nacelle 4 is joined to both the left and right ends of the structure 3. A front end of a mooring line 6 is attached to a center in the horizontal direction of the structure 3, and a base end of the mooring line 6 is moored to the ocean floor 7a (in this example, to an anchor weight 6A on the ocean floor 7a). The floating body 1 floats underwater in a horizontal direction and a vertical direction within a range restrained by the mooring line 6. The buoyancy of the floating body 1 is balanced between the left and the right, and the structure 3 of the floating body 1 is formed in an airfoil shape that faces the ocean current direction indicated by the hollow white arrow in FIG. 2. As such, the floating body 1 changes direction depending on the ocean current so that the front face of the floating body 1 (the front face of the rotary blades 5) directly faces the ocean current direction. Thus, power is generated while the front face receives the ocean current.

Additionally, each ocean current power generation device main body 2 uses a downwind system in which the rotary blade 5 is disposed behind (on the downstream side of the ocean current) the nacelle 4. The rotary blade 5 disposed farther to the downstream side than the nacelle 4 in this manner easily orient the front face of the floating body 1 (the front face of the rotary blades 5) in the ocean current direction. With underwater floating type ocean current power generation devices, it is difficult to implement a drive device for actively performing directional control of the floating body 1 (control to adjust the rotor rotating shaft in the direction of the ocean current). As such, in addition to utilizing a downwind system, a configuration is used in which shapes of the nacelle 4 and structure 3 of the floating body 1 are formed so as to be oriented in the ocean current direction, thus passively orienting the front face direction of the floating body 1 in the ocean current direction.

The floating body 1 (the underwater floating type ocean current power generation device) moored by the mooring line 6 floats underwater but, at this time, the floating body 1 assumes a position where the acting force $F_{wf}$ of the ocean current applied to the floating body 1, the buoyancy $F_b$ occurring in the floating body 1, and the tension $F_t$ of the mooring line 6 mooring the floating body 1 are balanced. In other words, buoyancy $F_b$ acts vertically upward on the floating body 1, the acting force $F_{wf}$ of the ocean current acts in the ocean current direction (the horizontal direction) on the floating body 1, and the tension $F_t$ of the mooring line 6 acts to oppose the buoyancy $F_b$ and the acting force $F_{wf}$ of the ocean current.

Figure 3:
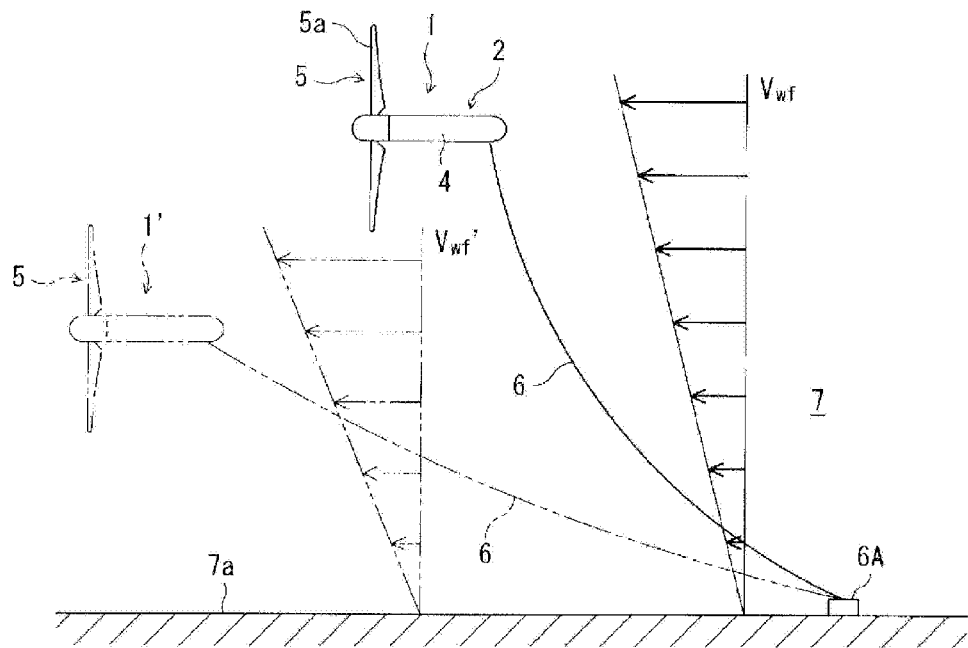
FIG. 3 is an underwater side view for explaining passive depth control (PDC) of a water depth direction position of the underwater floating type ocean current power generation device according to the embodiments.

Accordingly, as illustrated in FIG. 3, if the acting force $F_{wf}$ of the ocean current is weak (that is, if the current velocity $V_{wf}$ of the ocean current is low), the floating body 1 will rise to a comparatively shallow depth underwater, and if the acting force $F_{wf}$ of the ocean current is strong (that is, if the current velocity $V_{wf}'$ of the ocean current is high) the floating body 1 will sink to a depth, indicated by reference sign 1', that is comparatively deep underwater.

Additionally, in a current velocity distribution in the depth direction of the ocean current velocities $F_{wf}$ and $F_{wf}'$ near the ocean floor 7a, the current velocity is lower the closer the ocean current is to the ocean floor 7a and higher the farther away the ocean current is from the ocean floor 7a.

As such, in cases where the current velocity of the ocean current has strengthened, the floating body 1 will sink underwater 7, from the state indicated by the solid lines in FIG. 3 to the states indicated by the long dashed double-short dashed lines and the reference sign 1', and regain balance at a depth where the current velocity, in the current velocity distribution in the depth direction, has suitably weakened. Additionally, while not illustrated, if the current velocity of the ocean current is weakened more than the state indicated by the solid lines in FIG. 3, the floating body 1 will rise underwater from the state indicated by the solid lines and regain balance at a depth where the current velocity, in the current velocity distribution in the depth direction, has suitably strengthened. Control by which the water depth direction position of the underwater floating type ocean current power generation device configured as the floating body 1 is passively and automatically adjusted is also referred to as passive depth control (PDC). This PDC allows the rotary blades 5 to be held at a state where the received current velocity of the ocean current is not excessive or insufficient and, as a result, power can be generated while receiving stable current velocity of the ocean current.

Figure 2:
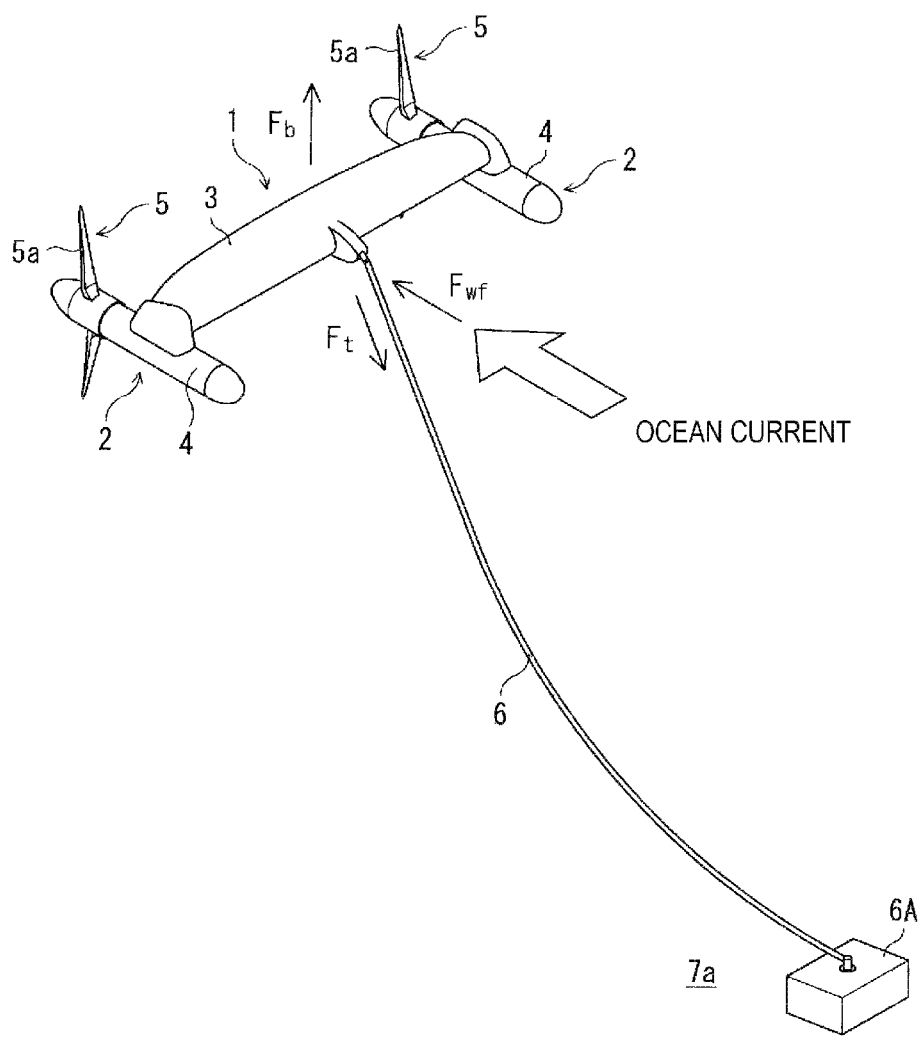
FIG. 2 is a perspective view illustrating a state in which the underwater floating type ocean current power generation device according to the embodiments is used underwater.
Figure 9A:
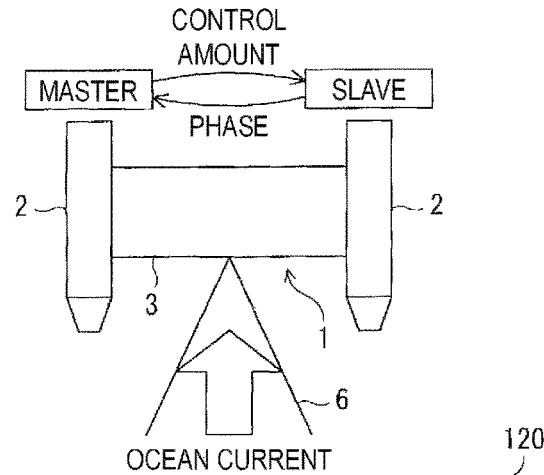
FIGS. 9A and 9B are drawings illustrating a control system of an underwater floating type ocean current power generation device according to a second embodiment.
Figure 9B:
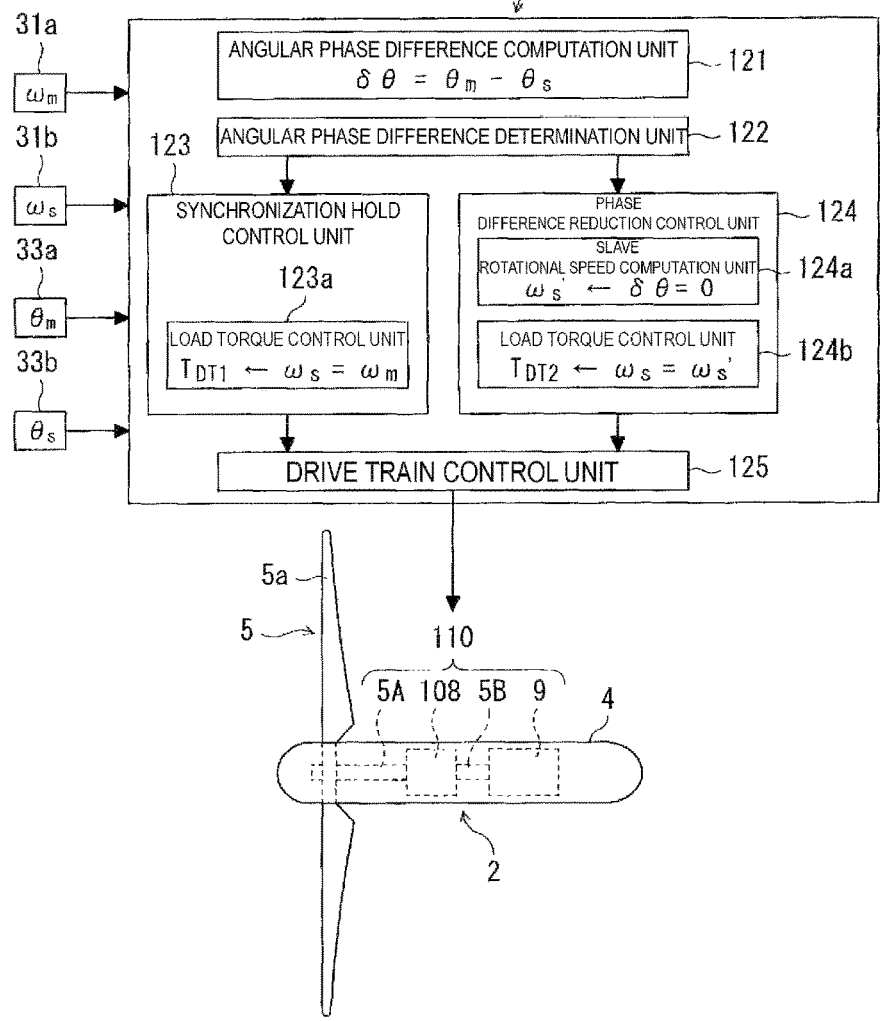

As illustrated in FIGS. 1, 2, and 9B, with each ocean current power generation device main body 2, the rotary blade 5 is disposed behind (on the downstream side of the ocean current) the nacelle 4. Additionally, a rotating shaft (main shaft) 5A of the rotary blade 5, speed increasers 8 and 108 for increasing the rotational speed of the main shaft 5A, and a power generator 9 that operates by receiving the rotational force increased by the speed increasers 8 and 108 are provided inside the nacelle 4. Drive trains 10 and 110 of each ocean current power generation device main body 2 are constituted from the main shaft 5A, the speed increasers 8 and 108, and the power generator 9.

In an external shape of the nacelle 4, a front end and a back end are constituted by smooth curved surfaces and a middle portion is formed in a cylindrical shape. An axial center of the main shaft 5A is disposed on an axial center CL1 of the external shape of the nacelle 4. The external shape of the nacelle 4 may also take a different shape such as a spindle shape. Two blades are utilized in the rotary blade 5. The rotary blade 5 is provided with two blades 5a arranged at a phase difference of 180 degrees. The number of the blades 5a of each of the rotary blades 5 is not limited thereto, and rotary blades with a different number of blades, such as three, may be used. Furthermore, the blades 5a that are simple, do not require maintenance, and have a fixed pitch are used.

As described above, with the underwater floating type ocean current power generation device, the floating body 1 preferably utilizes a twin drum model, and a downwind system is preferably utilized in which the rotary blade 5 is disposed behind (on the downstream side of the ocean current) the nacelle 4. In such a case, when the blades 5a of the rotary blade 5 pass through the shadow region (shadow moment region) of the structure 3, the thrust force of the ocean current applied to the blades declines as a result of reduced current velocity of the ocean current, and a moment (shadow moment), caused by the unbalance in the left and right thrust forces that occurs at this time, is created in the floating body 1.

The underwater floating type ocean current power generation device of the embodiments is provided with control devices 20 and 120 that include features (moment suppression means) for suppressing the creation of moments in the floating body 1 due to the reduction in the thrust force that occurs when the blades 5a of either of the rotary blades 5 enter the shadow moment region.

In the embodiments, specific configurations pertaining to the control for suppressing moments differ, and configurations related to the control for suppressing moments of each of the embodiments are described below. Note that herein, the term "moment" includes moments in any direction of the roll, pitch, and yaw.

First Embodiment

Configuration of Control System for Suppressing Moments

A control device 20 of the present embodiment is configured to suppress the creation of a roll, pitch, or yaw moment M in the floating body 1 by suppressing reductions themselves in thrust force $F_{th}$ of the ocean current that occur when the blades 5a enter the shadow region (shadow moment region) of the structure 3. Thus the control device 20 has functions of thrust force reduction suppression means as moment suppression means. The control device 20 is configured to suppress reductions in thrust force by increasing the rotational speed of the rotary blades 5 in accordance with reductions in current velocity $U_C$ of the ocean current.

Figure 4A:
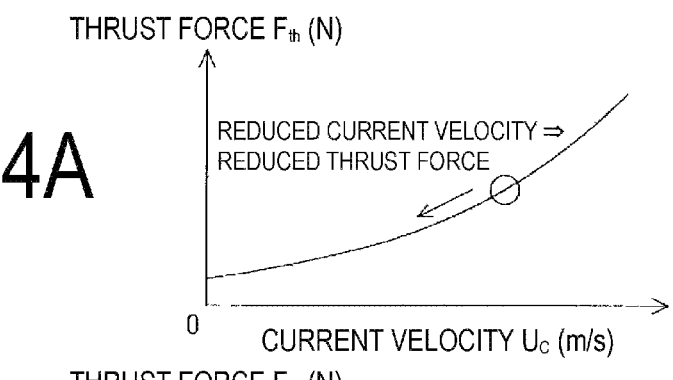
FIGS. 4A and 4B are drawings for explaining principles of control for suppressing moments in the underwater floating type ocean current power generation device according to the first embodiment.
Figure 4B:
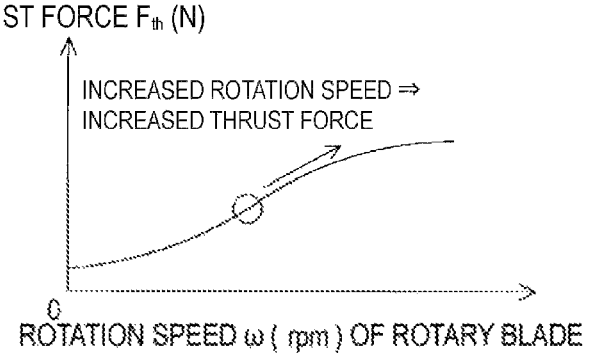

FIG. 4A is a characteristic diagram illustrating a relationship between the thrust force $F_{th}$ received from the ocean current and the current velocity $U_C$ of the ocean current in a case where the blades 5a are rotating at a constant rotation speed (rotational speed) co. In cases where the blades 5a are rotating at the constant rotation speed, the thrust force $F_{th}$ received from the ocean current increases as the current velocity $U_C$ of the ocean current increases. FIG. 4B is a characteristic diagram illustrating a relationship between the thrust force $F_{th}$ received from the ocean current and the rotation speed (rotational speed) co of the blades 5a in a case where the blades 5a receive the ocean current at a constant current velocity $U_C$. In cases where the blades 5a receive the ocean current at the constant current velocity $U_C$, the thrust force $F_{th}$ received from the ocean current increases as the rotation speed co of the blades 5a increases.

Focusing on these characteristics, if the thrust force $F_{th}$ becomes reduced due to a decline in the current velocity $U_C$ of the ocean current received by the blades 5a, the reduction in the thrust force $F_{th}$ can be suppressed by increasing the rotation speed ω of the blades 5a, thereby increasing the thrust force $F_{th}$. In other words, the current velocity $U_C$ of the ocean current received by the blades 5a declines while the blades 5a are in the shadow moment region. As such, if the rotation speed ω of the blades 5a is increased only during this period of time, the reduction in the thrust force $F_{th}$ caused by reduced current velocity of the ocean current in the shadow moment region can be canceled out by the increase in the thrust force $F_{th}$ caused by increasing the rotational speed of the blades 5a.

To suppress reductions in the thrust force $F_{th}$ in this manner, as illustrated in FIG. 1, the control device 20 of the present embodiment includes a blade rotation area determination unit 21, a target rotation control unit 22, a rotation increase control unit 23, and a drive train control unit 24 as functional constituents. Note that, herein, a configuration is given in which a control device 20 is provided in each individual ocean current power generation device main body 2 and each ocean current power generation device main body 2 is independently controlled. However, a configuration is possible in which the ocean current power generation device main bodies 2 are independently controlled while sharing a control device 20.

The blade rotation area determination unit 21 is configured to determine whether or not the blades 5a have entered a shadow moment region. Specifically, the blade rotation area determination unit 21 is configured to read a rotation angle (phase angle) $\theta_B$ of the blades 5a detected at a predetermined minute cycle by a blade rotation angle sensor 33 provided in the ocean current power generation device main body 2, and determine whether or not the blades 5a are in a rotation angle region $\theta_0$ to $\theta_1$ that corresponds to the shadow moment region.

Figure 5:
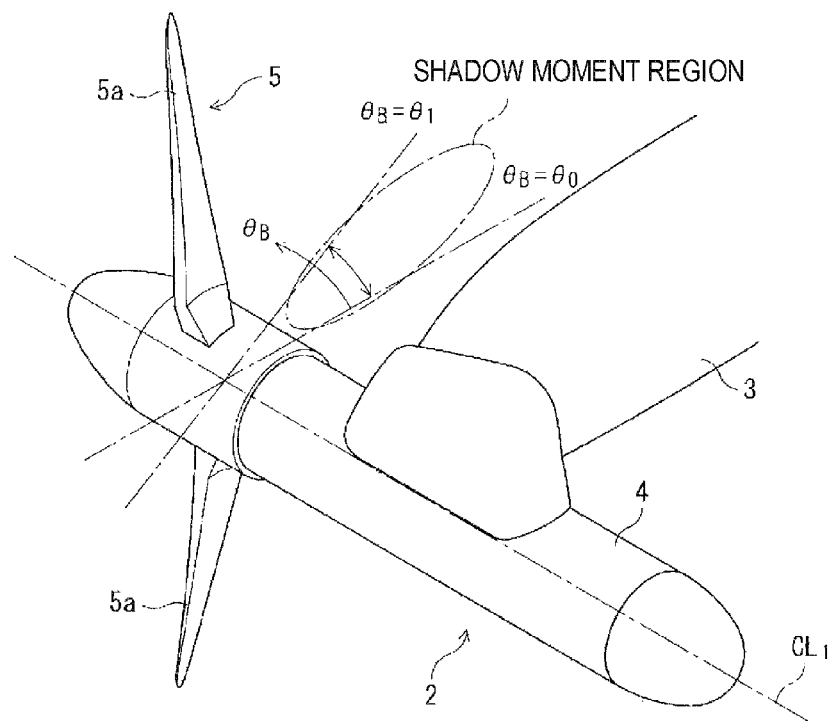
FIG. 5 is a perspective view of the main constituents of the floating body, explaining parameters of the control for suppressing moments in the underwater floating type ocean current power generation device according to the first embodiment.

As illustrated in FIG. 5, the rotation angle $\theta_B$ of the blades 5a is an angular amount offset in the rotation direction from a reference angle (not illustrated). Additionally, the angles $\theta_0$ and $\theta_1$, where $\theta_0<\theta_1$, that define the rotation angle region that corresponds to the shadow moment region are also angular amounts from the reference angle. The blade rotation area determination unit 21 determines whether or not the rotation angle $\theta_B$ of the blades 5a is of a size between an entry angle $\theta_0$ into the shadow moment region and an exit angle $\theta_1$ from the shadow moment region ($\theta_0 \leq \theta_B \leq \theta_1$).

In cases where the rotation angle $\theta_B$ of the blades 5a is within the angles $\theta_0$ to $\theta_1$ of the shadow moment region ($\theta_0 \leq \theta_B \leq \theta_1$), the blade rotation area determination unit 21 determines that the blades 5a are in the shadow moment region. In cases where the rotation angle $\theta_B$ of the blades 5a is outside the angles $\theta_0$ to $\theta_1$ of the shadow moment region ($\theta_B < \theta_0$ or $\theta_B > \theta_1$), the blade rotation area determination unit 21 determines that the blades 5a are not in the shadow moment region.

If the blade rotation area determination unit 21 determines that the blades 5a are not in the shadow moment region, the target rotation control unit 22 controls the rotational speed (hereinafter also referred to as the "blade rotation speed") of the blades 5a (that is, the rotary blade 5); if the blade rotation area determination unit 21 determines that the blades 5a are in the shadow moment region, the rotation increase control unit 23 controls the blade rotation speed co.

The target rotation control unit 22 includes a load torque control unit 22a and a thrust force computation unit 22b. At the target rotation control unit 22, the load torque control unit 22a computes and outputs a load torque target value $T_{DT}$ of the drive train 10 at which the blade rotation speed ω detected by the rotational speed sensor 31 provided in the ocean current power generation device main body 2 becomes a target rotation speed (target rotational speed) $\omega_0$. At the thrust force computation unit 22b, computations are always performed in order to constantly understand the thrust force $F_{th}$ acting on the blades 5a (that is, the rotary blades 5).

The load torque $T_D$ of the drive train 10 is the power generation load torque of the power generator 9, and the load torque $T_D$ can be controlled by operating an inverter of the power generator 9. Note that the target rotation speed ω is preset as the rotation speed at which the power generation of the power generator 9 is most efficient. The load torque control unit 22a controls the blade rotation speed ω to reach the target rotation speed $\omega_0$ by increasing the load torque target value $T_{DT}$ by a predetermined amount (or exactly an amount such that the difference between ω and $\omega=|\omega-\omega_0|$) if the blade rotation speed ω is greater than the target rotation speed ω; and decreasing the load torque target value $T_{DT}$ by a predetermined amount (or exactly an amount such that the difference between ω and $\omega_0=|\omega-\omega_0|$) if the blade rotation speed ω is less than the target rotation speed $\omega_0$.

The thrust force computation unit 22b computes the thrust force $F_{th}$ using a pre-recorded table, map, or arithmetic expression (see Equation (1) below) on the basis of the current velocity $U_C$ around the floating body 1 detected by the current velocity sensor 32 provided in the ocean current power generation device main body 2, the blade rotation speed ω detected by the rotational speed sensor 31, the blade rotation angle $\theta_B$ detected by the blade rotation angle sensor 33, and a rotation angle $\theta_F$ of the floating body 1 detected by a floating body rotation angle sensor 34 provided in the ocean current power generation device main body 2.

$$F_{th}=f(U_C,\omega,\theta_B,\theta_F) \quad (1)$$

Figure 6:
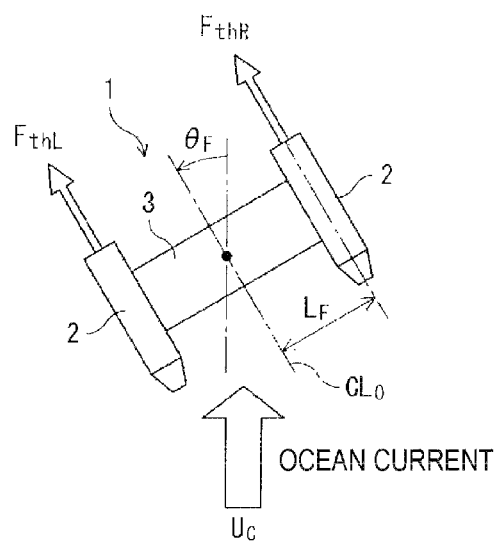
FIG. 6 is a schematic plan view of the floating body, explaining parameters of the control for suppressing moments in the underwater floating type ocean current power generation device according to the first embodiment.

The current velocity sensor 32 is configured to detect the current velocity $U_C$ of the ocean current around the floating body 1 (particularly around the rotary blades 5). As illustrated in FIG. 6, the floating body rotation angle sensor 34 is configured to detect a direction angle (direction angle of a center line CL0 of the floating body 1) of the floating body 1 with respect to the direction of the ocean current. The floating body rotation angle sensor 34 is configured to detect the direction angle of the floating body 1 by detecting the direction of the ocean current with respect to the floating body 1. Note that the current velocity sensor 32 and the floating body rotation angle sensor 34 may be configured as an ocean current sensor that simultaneously detects the direction of the ocean current with respect to the floating body 1 and the current velocity of the ocean current. Additionally, as illustrated in FIG. 6, when distinguishing between thrust forces $F_{th}$ on the left and the right, thrust force on the left side is referred to as $F_{thL}$ and thrust force on the right side is referred to as $F_{thR}$.

The rotation increase control unit 23 includes a reduced current velocity computation unit 23a, a rotational speed computation unit 23b, and a load torque control unit 23c. The rotation increase control unit 23 computes a reduced current velocity $U_C'$ of the ocean current at which the blades 5a are in the shadow moment region; computes a blade rotation speed $\omega'$ at which a thrust force $F_{th}'$ at this current velocity $U_C'$ is equivalent to the thrust force $F_{th}$ most recently computed by the thrust force computation unit 22b of the target rotation control unit 22; and controls the load torque $T_D$ of the drive train 10 such that the blade rotation speed $\omega$ detected by the rotational speed sensor 31 becomes the computed blade rotation speed $\omega'$.

Specifically, the reduced current velocity computation unit 23a computes the current velocity $U_C'$ of the ocean current for when the blades 5a are in the shadow moment region (see Equation (2) below) by multiplying the current velocity $U_C$ detected by the current velocity sensor 32 by a shadow moment region coefficient α. The shadow moment region coefficient α is determined by the shape of the structure 3 and the shape of the blades 5a. Here, a uniform shadow moment region coefficient α is applied inside the shadow moment region. However, in the shadow moment region, the reduction in the current velocity $U_C$ of the ocean current is small at boundary areas in the region (near the entry angle $\theta_0$ and the exit angle $\theta_1$), and the reduction in the current velocity $U_C$ of the ocean current is great at a central area in the region (near the middle between the entry angle $\theta_0$ and the exit angle $\theta_1$). As such, this may be taken into consideration and the value of the shadow moment region coefficient α may be set depending on the blade rotation angle $\theta_B$.

$$U_C' = U_C \times \alpha \quad (2)$$

As shown in Equation (1) above, at the rotational speed computation unit 23b, correlation between the thrust force $F_{th}$ and the current velocity $U_C'$ of the ocean current, the blade rotation speed $\omega$, the blade rotation angle $\theta_B$, and the rotation angle $\theta_F$ of the floating body 1 are focused on. The blade rotation speed $\omega'$ (thrust force reduction suppressing rotation speed or thrust force reduction suppressing rotational speed), at which the thrust force $F_{th}'$, when the current velocity $U_C'$ of the ocean current computed by the rotational speed computation unit 23b is given as the current velocity $U_C'$ of the ocean current, is equivalent to the thrust force $F_{th}$ most recently computed by the thrust force computation unit 22b of the target rotation control unit 22b, is computed using table data or the like (see Equation (3) below).

$$F_t' = f(U_C', \omega', \theta_B, \theta_F) = F_{th} \quad (3)$$

The current velocity $U_C'$ of the ocean current inside the shadow moment region is less than the current velocity $U_C$ of the ocean current outside of the shadow moment region and the thrust force $F_{th}$ is reduced. As such, to restore the thrust force $F_{th}$, the blade rotation speed $\omega'$ inside the shadow moment region is increased greater than the blade rotation speed $\omega$ that is controlled to the target rotation speed $\omega$ outside the shadow moment region (see FIGS. 4A and 4B).

At the load torque control unit 23c, a load torque target value $T_{DT}$ of the drive train 10 at which the blade rotation speed $\omega$ detected by the rotational speed sensor 31 provided in the ocean current power generation device main body 2 becomes a thrust force reduction suppressing rotation speed $\omega'$ is computed and outputted. For example, the load torque control unit 22a performs control such that the blade rotation speed $\omega$ becomes the thrust force reduction suppressing speed $\omega'$ by increasing the load torque target value $T_{DT}$ by a predetermined amount (or exactly an amount such that the difference between $\omega$ and $\omega_0 = |\omega - \omega_0|$) if the blade rotation speed $\omega$ is greater than the thrust force reduction suppressing rotation speed $\omega'$; and decreasing the load torque target value $T_{DT}$ by a predetermined amount (or exactly an amount such that the difference between $\omega$ and $\omega = |\omega - \omega_0|$) if the blade rotation speed $\omega$ is less than the thrust force reduction suppressing rotation speed $\omega'$.

However, considering that the current velocity $U_C'$ of the ocean current when the blades 5a are in the shadow moment region is a value of the central area of the shadow moment region, the current velocity of the ocean current does not decline to the computed value $U_C'$ when the blades 5a enter and exit the shadow moment region (in cases where the rotation angle $\theta_B$ of the blades 5a is close to the entry angle $\theta_0$ or the exit angle $\theta_1$), and from the perspective of avoiding abrupt changes in the load torque $T_D$ at a time of switching control, a configuration is given in which the load torque target value $T_{DT}$ is calculated at the load torque control unit 23c by processing using a control gain K.

The drive train control unit 24 is configured to control the load torque $T_D$ (power generation load torque) of the drive train 10 on the basis of the load torque target value $T_{DT}$ computed by either the load torque control unit 22a or 23c. If the load torque $T_D$ is controlled on the basis of the load torque target value $T_{DT}$ computed by the load torque control unit 22a of the target rotation control unit 22, the blade rotation speed $\omega$ will be controlled to the target rotation speed $\omega_0$ at which the power generator 9 can generate power in the most efficient manner. If the load torque $T_D$ is controlled on the basis of the load torque target value $T_{DT}$ computed by the load torque control unit 23c of the rotation increase control unit 23, the blade rotation speed $\omega$ will be controlled to the thrust force reduction suppressing rotation speed $\omega'$ at which the thrust force $F_{th}$ does not fluctuate even when the blades 5a enter the shadow moment region.

Actions and Effects

Figure 7:
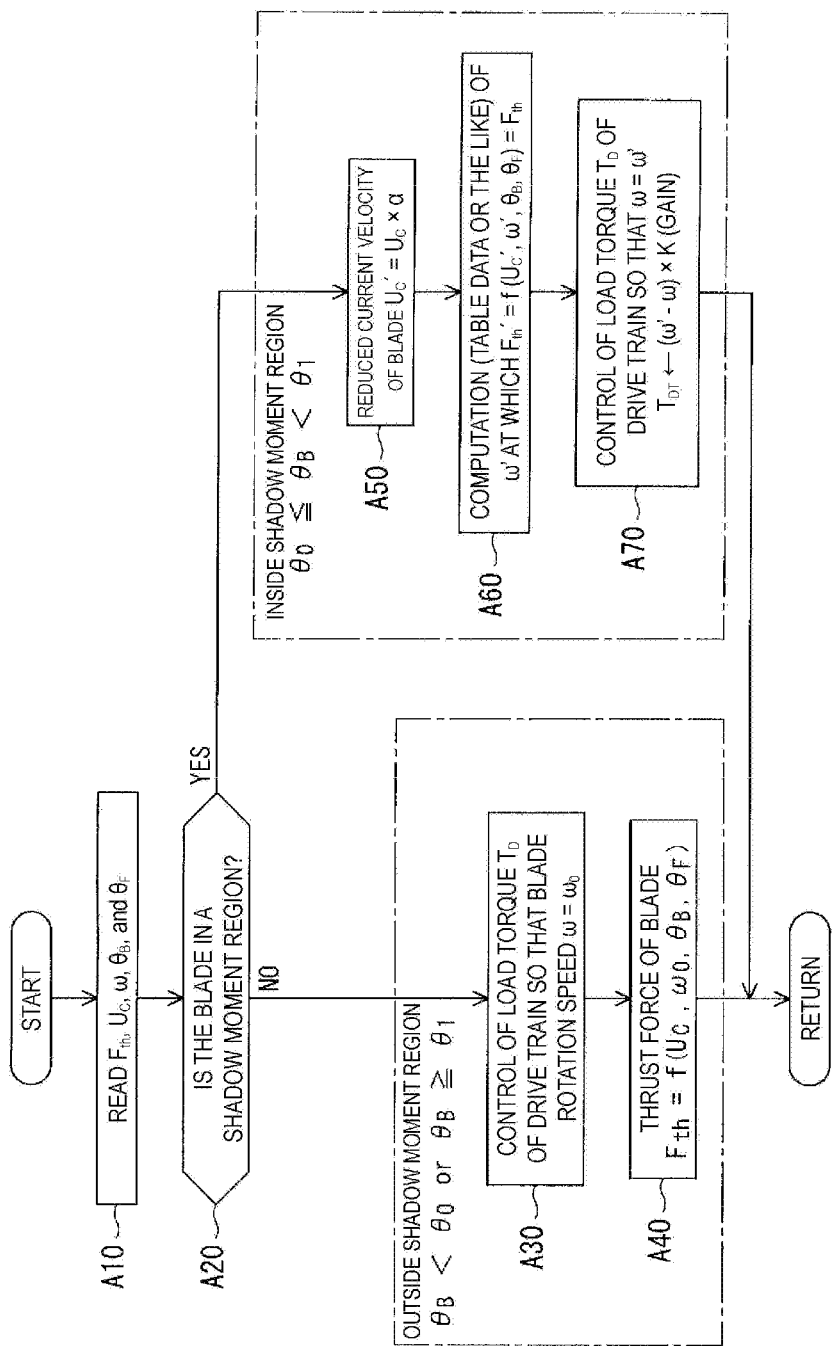
FIG. 7 is a flowchart explaining the control for suppressing moments in the underwater floating type ocean current power generation device according to the first embodiment.

The underwater floating type ocean current power generation device according to the first embodiment is configured as described above and, as a result, as illustrated in, for example, the flowchart of FIG. 7, the control device 20 can perform control for suppressing moments whereby the creation of moments in the floating body 1 is suppressed. Note that the flowchart of FIG. 7 is performed at a predetermined control cycle.

As illustrated in FIG. 7, first, the thrust force $F_{th}$, the current velocity $U_C$ of the ocean current, the blade rotation speed $\omega$, the rotation angle $\theta_B$ of the blades 5a, and the rotation angle $\theta_F$ of the floating body 1 are read (step A10). For the thrust force $F_{th}$, the value computed and recorded by the thrust force computation unit 22b of the target rotation control unit 22 at the most recent control cycle is read. For the current velocity $U_C$ of the ocean current, the blade rotation speed ω, the rotation angle $\theta_B$ of the blades 5a, and the rotation angle $\theta_F$ of the floating body 1, the most recent detection values detected by the current velocity sensor 32, the rotational speed sensor 31, the blade rotation angle sensor 33, and the floating body rotation angle sensor 34 are read.

Then, the blade rotation area determination unit 21 determines whether or not the blades 5a are in the shadow moment region, that is, whether or not the rotation angle $\theta_B$ of the blades 5a is within the angle range $\theta_0$ to $\theta_1$ ($\theta_0 \leq \theta_B \leq \theta_1$) of the shadow moment region (step A20). Here, if it is determined that the blades 5a are not in the shadow moment region, step A30 is carried out, and if it is determined that the blades 5a are in the shadow moment region, step A50 is carried out.

If the blades 5a are outside the shadow moment region ($\theta_B < \theta_0$ or $\theta_B > \theta_1$), the target rotation control unit 22 controls the load torque $T_D$ of the drive train 10 and computes the thrust force $F_{th}$. Specifically, at the load torque control unit 22a, a load torque target value $T_{DT}$ of the drive train 10 at which the blade rotation speed ω becomes the target rotation speed $\omega_0$ is computed and exported; and at the drive train control unit 24, the load torque of the drive train 10 is controlled on the basis of the computed load torque target value $T_{DT}$ (step A30).

Then, at the thrust force computation unit 22b, using Equation (1) described above, the thrust force $F_{th}$ acting on the blades 5a is computed on the basis of the current velocity $U_C$ of the ocean current, the blade rotation speed ω, the rotation angle $\theta_B$ of the blades 5a, and the rotation angle $\theta_F$ of the floating body 1 (step A40). The computed thrust force $F_{th}$ is stored in the memory of the control device 20 and is appropriately used in subsequent control cycles.

On the other hand, if the blades 5a are inside the shadow moment region ($\theta_0 \leq \theta_B \leq \theta_1$), the rotation increase control unit 23 controls the load torque $T_D$ of the drive train 10. Specifically, the reduced current velocity computation unit 23a computes the current velocity $U_C'$ of the ocean current for when the blades 5a are in the shadow moment region (see Equation (2) above) by multiplying the current velocity $U_C$ by the shadow moment region coefficient α (step A50). At the rotational speed computation unit 23b, a blade rotation speed ω' is computed (see Equation (3) above) at which the thrust force $F_{th}'$, of a case where the current velocity $U_C'$ computed as the current velocity $U_C$ of the ocean current is used in the above-described Equation (1), is equivalent to the thrust force $F_t$ most recently computed by the thrust force computation unit 22b of the target rotation control unit 22 (step A60).

Then, the load torque control unit 23c computes a load torque target value $T_{DT}$ of the drive train 10 at which the blade rotation speed ω becomes the thrust force reduction suppressing rotation speed ω'. However, considering that the current velocity of the ocean current does not decline to the computed value $U_C'$ when the blades 5a enter and exit the shadow moment region (in cases where the rotation angle $\theta_B$ of the blades 5a is close to the entry angle $\theta_0$ or the exit angle $\theta_1$), and from the perspective of avoiding abrupt changes in the load torque $T_D$ at a time of switching control, the load torque target value $T_{DT}$ is calculated by processing using the control gain K.

That is, when the blades 5a enter the shadow moment region, the blade rotation speed ω is increased from the target rotation speed $\omega_0$ to the thrust force reduction suppressing rotation speed ω'. As such, the load torque target value $T_{DT}$ is reduced from the value that is computed and set in step A30. The load torque target value $T_{DT}$ is calculated by processing using the control gain K so that this reduction is performed in a ramp-like manner. Note that when the blades 5a exit from the shadow moment region, the load torque target value $T_{DT}$ is increased in order to reduce the blade rotation speed ω from the thrust force reduction suppressing rotation speed ω' to the target rotation speed $\omega_0$. However, the load torque target value $T_{DT}$ is calculated by processing using the control gain K so that this increase is also performed in a ramp-like manner.

Figure 8A:
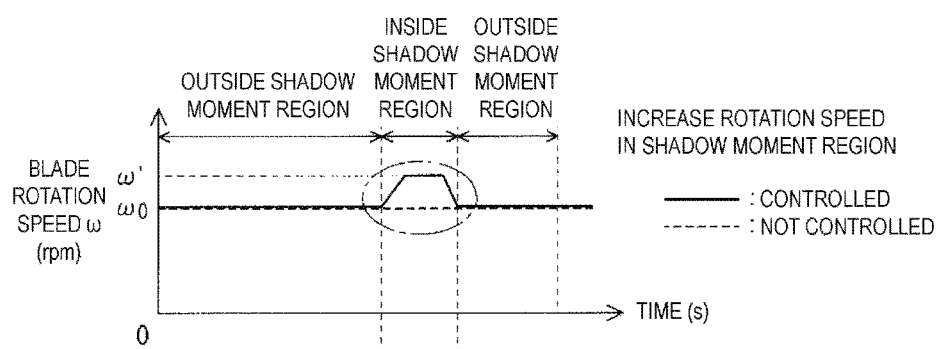
FIGS. 8A and 8B are time charts illustrating advantageous effects of the control for suppressing moments in the underwater floating type ocean current power generation device according to the first embodiment.

Thus, as illustrated by the solid lines in FIG. 8A, when the blades 5a enter the shadow moment region, the rotation speed ω of the blades 5a is gradually increased to the thrust force reduction suppressing rotation speed ω'; and, when the blades 5a exit from the shadow moment region, the rotation speed ω of the blades 5a is gradually decreased and returned to the target rotation speed $\omega_0$. In cases where not performing this control, as illustrated by the dashed lines in FIG. 8A, the rotation speed ω of the blades 5a is held at the target rotation speed $\omega_0$, regardless of whether or not the blades 5a are inside the shadow moment region.

At the drive train control unit 24, the load torque of the drive train 10 is controlled on the basis of the load torque target value $T_{DT}$ computed as described above (step A70).

Figure 8B:
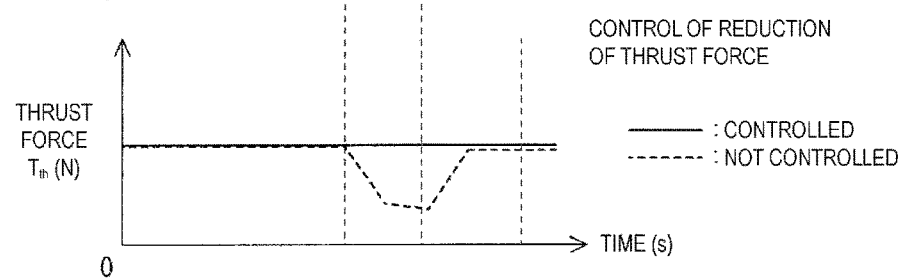

As such, the thrust force $F_{th}'$ acting on the blades 5a (the rotary blades 5) in cases where the blades 5a are inside the shadow moment region ($\theta_0 \leq \theta_B \leq \theta_1$) is equivalent to the thrust force $F_{th}$ in cases where the blades 5a are outside the shadow moment region ($\theta_B < \theta_0$ or $\theta_B > \theta_1$). Additionally, as illustrated by the solid lines in FIG. 8B, reductions in the thrust force $F_{th}$ themselves can be suppressed. In cases where not performing this control, the thrust force $F_{th}$ declines as illustrated by the dashed lines in FIG. 8B.

Thus, the thrust force $F_{th}$ is increased by increasing the rotational speed of the blades 5a so as to cancel out reductions in the thrust force $F_{th}$ caused by the reduced current velocity of the ocean current in the shadow moment region and, as a result, reductions in the thrust force $F_{th}$ themselves are suppressed. Therefore, the creation of the moment M in the floating body 1, which is caused by the reduction in the thrust force $F_{th}$, can be suppressed, and the generation of cyclical vibration in the direction of the floating body, which is caused by this moment, can be suppressed. If this vibration is generated, the structure 13 of the floating body 1, the blades 5a, the mooring lines 6, and the like may be damaged, but this is avoided.

Second Embodiment

Configuration of Control System for Suppressing Moments

In the present embodiment, the rotational phases of the blades 5a are controlled so that the blades 5a of the rotary blade 5 of each left and right ocean current power generation device main body 2 synchronize and enter the shadow moment region of the shadow of the structure 3 and cause reductions in the left and right thrust forces $F_{thL}$ and $F_{thR}$ (see FIG. 6) to simultaneously occur. Thereby, the creation of moments is suppressed. Thus, functions of rotational phase control means are provided as the moment suppression means. Particularly, in the present embodiment, as illustrated in FIG. 9A, one of the left and right ocean current power generation device main bodies 2 is set as a master device and the other is set as the slave device. In this configuration, the rotational phase of the blades 5a of the rotary blade 5 of the master device is set as the reference phase, and the blades 5a of the slave device are controlled such that the rotational phase of the blades 5a of the rotary blade 5 of the slave device conforms to and synchronizes with the reference phase.

As such, as illustrated in FIG. 9B, the control device 120 of the present embodiment includes an angular phase difference computation unit 121, an angular phase difference determination unit 122, a synchronization hold control unit 123, a phase difference reduction control unit 124, and a drive train control unit 125 as functional constituents. Note that, here, a configuration is given in which the control device 120 is provided on the master device side, a master signal (control amount) is output from the master device side, and phase responses are given on the slave device side. However, it is sufficient that the rotational phase of the blades 5a on the master device side is configured as the primary phase and the rotational phase of the blades 5a on the slave device side is made to conform thereto. As such, the control device 120 itself may be provided on the slave device side.

As shown in Equation (4) below, the angular phase difference computation unit 121 computes a difference (phase difference) δθ between a blade rotation angle $\theta_m$ of the master device and a blade rotation angle $\theta_s$ of the slave device, which are detected by blade rotation angle sensors 33a and 33b provided respectively in the ocean current power generation device main body 2 of the master device and the slave device.

$$\delta\theta = \theta_m - \theta_s \qquad (4)$$

The angular phase difference determination unit 122 determines whether or not the blades 5a of the master device and the blades 5a of the slave device are in a synchronized state from the phase difference δθ between the blade rotation angle $\theta_m$ of the master device and the blade rotation angle $\theta_s$ of the slave device. That is, the angular phase difference determination unit 122 determines whether or not the phase difference δθ is within a permissible value $\delta\theta_0$, which is 0 or a minute value close to 0 ($\delta\theta \leq \delta\theta_0$). If the phase difference δθ is within the permissible value $\delta\theta_0$, it is determined that the blades 5a are in a synchronized state (no phase difference), and if not, it is determined that the blades 5a are in an asynchronous state (phase difference exists).

If the angular phase difference determination unit 122 determines that the blade rotation angle $\theta_m$ of the master device and the blade rotation angle $\theta_s$ of the slave device are in a synchronized state, the synchronization hold control unit 123 performs synchronization hold control for holding the synchronized state of the blades 5a of the slave device to the blades 5a of the master device. If the angular phase difference determination unit 122 determines that the blade rotation angle $\theta_m$ of the master device and the blade rotation angle $\theta_s$ of the slave device are in an asynchronous state, the phase difference reduction control unit 124 performs phase difference reduction control for bringing the blade rotation angle $\theta_s$ of the slave device closer to the blade rotation angle $\theta_m$ of the blades 5a of the master device and synchronizing the blade rotation angle $\theta_s$ of the slave device with the blade rotation angle $\theta_m$ of the master device.

The synchronization hold control unit 123 includes a load torque control unit 123a. At the synchronization hold control unit 123, a load torque target value $T_{DT1}$ of a drive train 110 of the slave device at which the blade rotation speed $\omega_s$ of the slave device is equivalent to the blade rotation speed ω of the master device is computed and outputted by the load torque control unit 123a. This computation is performed on the basis of the blade rotation speed $\omega_m$ of the master device and the blade rotation speed $\omega_s$ of the slave device detected by rotational speed sensors 31a and 31b provided respectively in the ocean current power generation device main bodies 2 of the master device and the slave device.

In this case, if a minute amount of phase difference δθ occurs, even if within the permissible value $\delta\theta_0$, the load torque target value $T_{DT1}$ is increased or decreased so as to bring the phase difference δθ close (where the blade rotation speed $\omega_s$ of the slave device is equivalent to the blade rotation speed $\omega_m$ of the master device) to 0. However, to ensure that the load torque target value $T_{DT1}$ changes gradually in a ramp-like manner, the load torque target value $T_{DT1}$ is calculated at the load torque control unit 123a by processing using a control gain $K_1$.

The phase difference reduction control unit 124 includes a slave rotational speed computation unit 124a and a load torque control unit 124b.

The slave rotational speed computation unit 124a is configured to compute a target value $\omega_s'$ of the blade rotational speed of the slave device in order to set the phase difference δθ to 0. In this case as well, to ensure that the blade rotation speed ω of the slave device changes gradually in a ramp-like manner, the target value $\omega_s'$ of the blade rotational speed is calculated at the slave rotational speed computation unit 124a by processing using a control gain $K_2$.

At the load torque control unit 124b, a load torque target value $T_{DT2}$ of the drive train 110 of the slave device at which the blade rotation speed $\omega_s$ of the slave device is equivalent to the target value $\omega_s'$ of the blade rotational speed of the slave device is computed and outputted. This computation is performed on the basis of the blade rotation speed $\omega_m$ of the master device detected by the rotational speed sensor 31a and the target value $\omega_s'$ of the blade rotational speed of the slave device computed by the slave rotational speed computation unit 124a. In this case as well, to ensure that the load torque target value $T_{DT2}$ changes gradually in a ramp-like manner, the load torque target value $T_{DT2}$ is calculated at the load torque control unit 123a by processing using the control gain $K_1$.

The drive train control unit 125 is configured to control the load torque $T_D$ (power generation load torque) of the drive train 110 on the basis of the load torque target value $T_{DT1}$ computed by the load torque control unit 123a of the synchronization hold control unit 123 or the load torque target value $T_{DT2}$ computed by either load torque control unit 124b of the phase difference reduction control unit 124.

In the present embodiment, the drive train 110 is provided with a rotating shaft (main shaft) 5A of the rotary blade 5, a speed increaser 108 for increasing the rotational speed of the main shaft 5A, and a power generator 9 that operates by receiving the rotational force increased by the speed increaser 108. In this configuration, a hydraulic power transmission mechanism is used as the speed increaser 108, and the gear ratio of the speed increaser 108 can be changed by operating the elements of the hydraulic power transmission mechanism.

Figure 10:
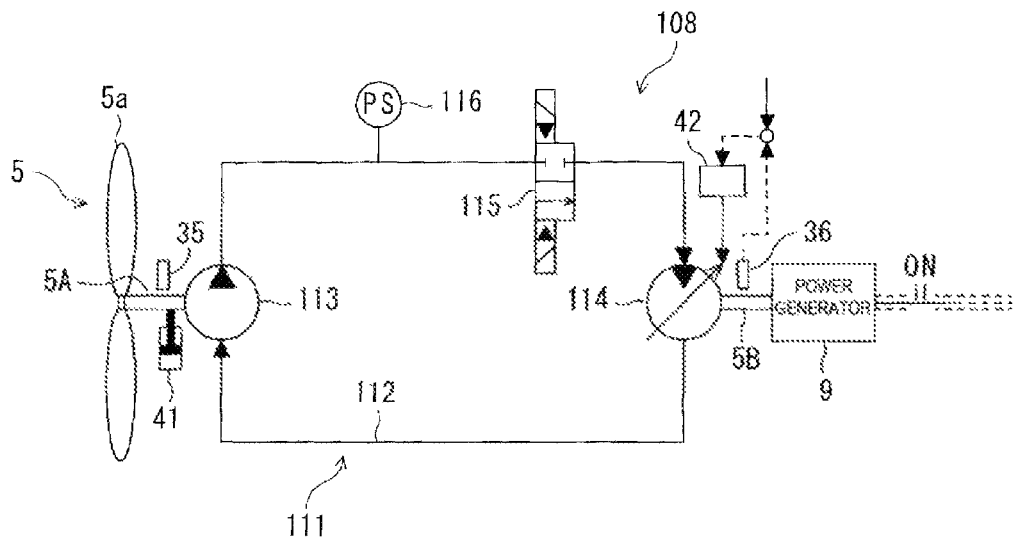
FIG. 10 is a drawing illustrating a hydraulic circuit and surrounding configurations provided in each of the ocean current power generation device main bodies of the underwater floating type ocean current power generation device according to the second embodiment.

FIG. 10 is a hydraulic circuit diagram illustrating the hydraulic power transmission mechanism 108 that also functions as the speed increaser. A hydraulic circuit 111 is provided with, in an oil passage 112, a hydraulic pump 113 driven by the rotating shaft 5A of the rotary blade 5, a hydraulic motor 114 that rotates by receiving hydraulic oil discharged from the hydraulic pump 113, an on-off valve 115 interposed at a portion of the oil passage 112 toward the hydraulic motor 114 from the hydraulic pump 113, and a pressure sensor 116 provided at a portion of the oil passage 112 toward the hydraulic motor 114 from the hydraulic pump 113.

A swash plate type hydraulic motor, whose rotational speed can be changed by adjusting the swash plate angle without the input oil pressure changing, is used as the hydraulic motor 114. The rotational speed (rotation speed) of a rotating shaft 5B of the hydraulic motor 114 detected by a rotational speed sensor 36 is fed back and, as a result, the hydraulic motor 114 can be adjusted to a desired rotational speed state by using a swash plate angle adjusting unit 42 to adjust the swash plate angle. The rotating shaft 5B of the hydraulic motor 114 is connected to the power generator 9.

Additionally, by adjusting the swash plate angle of the hydraulic motor 114, the load torque of the hydraulic motor 114 can be adjusted, and the load torque of the hydraulic motor 114 can be understood via the pressure of the hydraulic oil detected by the pressure sensor 116. In other words, the load torque of the drive train 110 can be adjusted by adjusting the swash plate angle of the hydraulic motor 114, and, as such, the swash plate angle of the hydraulic motor 114 is adjusted in accordance with the load torque target values $T_{DT1}$ and $T_{DT2}$, and the load torque (power generation load torque) $T_D$ of the drive train 110 is controlled.

Note that with the configuration illustrated in FIG. 10, the rotating shaft 5A of the rotary blade 5 is provided with a speed regulator 35 and a mechanical brake 41. In this configuration, the rotational speed of the rotary blade 5 is stabilized by the speed regulator 35 and the rotation of the rotary blade 5 can be regulated by the mechanical brake 41.

Actions and Effects

Figure 11:
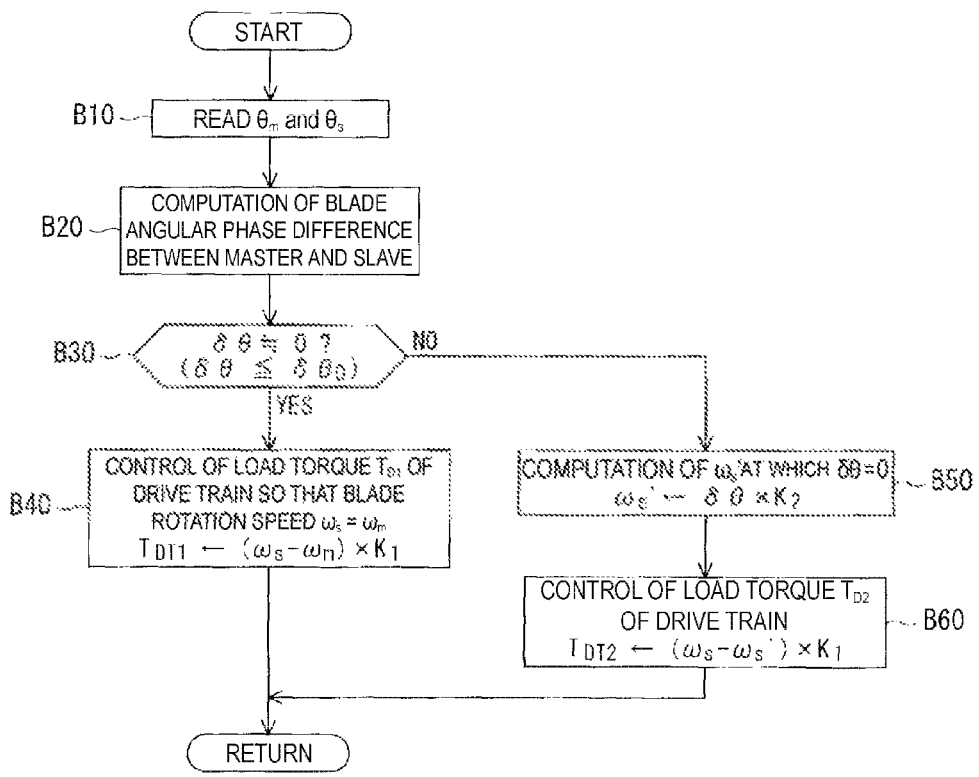
FIG. 11 is a flowchart explaining the control for suppressing moments in the underwater floating type ocean current power generation device according to the second embodiment.

The underwater floating type ocean current power generation device according to the second embodiment is configured as described above and, as a result, as illustrated in, for example, the flowchart of FIG. 11, the control device 120 can perform control for suppressing moments whereby the creation of moments in the floating body 1 is suppressed. Note that the flowchart of FIG. 11 is performed at a predetermined control cycle.

As illustrated in FIG. 11, first, the blade rotation angle $\theta_m$ of the master device and the blade rotation angle $\theta_s$ of the slave device detected by the blade rotation angle sensors 33a and 33b are read (step B10). Then, the angular phase difference computation unit 121 computes (see Equation (4) above) the difference (phase difference) $\delta\theta$ between the blade rotation angle $\theta_m$ of the master device and the blade rotation angle $\theta_s$ of the slave device (step B20).

Next, the angular phase difference determination unit 122 compares the phase difference $\delta\theta$ computed in step B20 with a preset permissible value $\delta\theta_0$ and determines whether the blades 5a of the master device and the blades 5a of the slave device are in a synchronized state ($|\delta\theta| \le \delta\theta_0$) or not (in an asynchronous state) (step B30). At step B30, if the blades 5a of the master device and the blades 5a of the slave device are determined to be in a synchronized state, the synchronization hold control unit 123 performs synchronization hold control (step B40), and if determined to be in an asynchronous state, the phase difference reduction control unit 124 performs phase difference reduction control (steps B50 and B60).

In the synchronization hold control of step B40, the load torque target value $T_{DT1}$ of the drive train 110 of the slave device at which the blade rotation speed $\omega_s$ of the slave device is equivalent to the blade rotation speed cam of the master device is computed and output. In this case, to ensure that the load torque target value $T_{DT2}$ changes gradually in a ramp-like manner, the load torque target value $T_{DT1}$ is calculated by processing using the control gain $K_1$. Then, the drive train control unit 125 controls the load torque $T_D$ (power generation load torque) of the drive train 110 on the basis of the load torque target value $T_{DT2}$.

In the phase difference reduction control of steps B50 and B60, first, the slave rotational speed computation unit 124a computes a target value $\omega_s'$ of the blade rotational speed of the slave device for setting the phase difference $\delta\theta$ to 0. In this case as well, to ensure that the blade rotation speed $\omega_s$ of the slave device changes gradually in a ramp-like manner, the target value $\omega_s'$ of the blade rotational speed is calculated at the slave rotational speed computation unit 124a by processing using the control gain $K_2$ (step B50).

Next, the load torque control unit 124b computes and outputs the load torque target value $T_{DT2}$ of the drive train 110 of the slave device at which the blade rotation speed $\omega_s$ of the slave device is equivalent to the target value $\omega_s'$ of the blade rotational speed of the slave device. This computation is performed on the basis of the detected blade rotation speed $\omega_m$ of the master device and the target value $\omega_s'$ of the blade rotational speed of the slave device. In this case as well, to ensure that the load torque target value $T_{DT2}$ changes gradually in a ramp-like manner, the load torque target value $T_{DT2}$ is calculated at the load torque control unit 123a by processing using the control gain $K_1$. Then, the drive train control unit 125 controls the load torque $T_D$ (power generation load torque) of the drive train 110 on the basis of the load torque target value $T_{DT2}$ (step B60).

Figure 12:
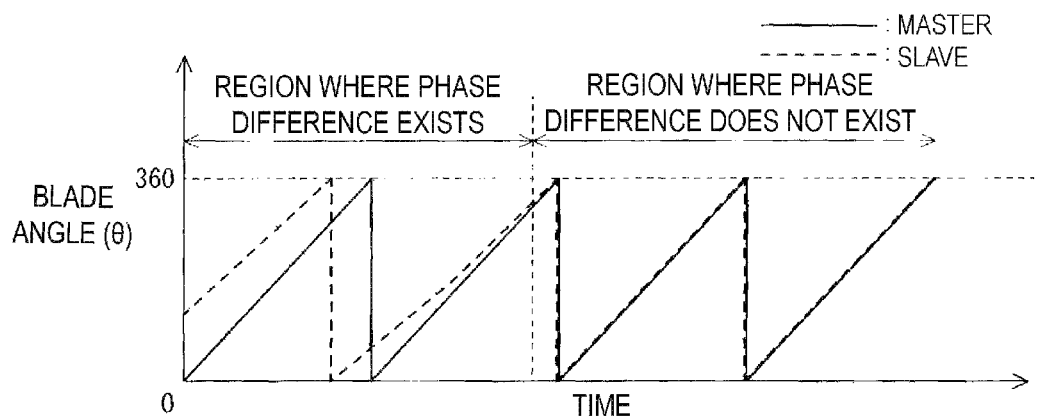
FIG. 12 is a time chart illustrating advantageous effects of the control for suppressing moments in the underwater floating type ocean current power generation device according to the second embodiment.

FIG. 12 is a time chart that illustrates changing of the blade rotation angle (blade angle) $\theta_B$ in order to explain the phase difference reduction control and the synchronization hold control. The solid line illustrates the blade rotation angle $\theta_B$ of the master device, and the dashed line illustrates the blade rotation angle $\theta_B$ of the slave device. As illustrated in FIG. 11, if the angular phase difference determination unit 122 determines an asynchronous state, the blade rotation angle $\theta_B$ of the slave device is gradually made to approach the blade rotation angle $\theta_B$ of the master device in the phase difference reduction control, thus eliminating the phase difference. Thereafter, the state free of phase difference (the synchronized state) is held by the synchronization hold control.

In this manner, the blade rotation angle $\theta_B$ of the slave device is controlled so as to synchronize with the blade rotation angle $\theta_B$ of the master device. As such, even if the blades 5a enter the shadow moment region of the shadow of the structure and a reduction in the thrust force due to reduced current velocity of the ocean current occurs, reductions in the thrust forces $F_{thL}$ and $F_{thR}$ at the left and right ocean current power generation device main bodies 2 are simultaneously generated and, as a result, the creation of a moment can be suppressed even if a reduction in the thrust force occurs, and the generation of cyclical vibration in the direction of the floating body 1 can be suppressed. If this vibration is generated, the structure 13 of the floating body 1, the blades 5a, the mooring lines 6, and the like may be damaged, but this is avoided.

Third Embodiment

Configuration of Control System for Suppressing Moments

Figure 13:
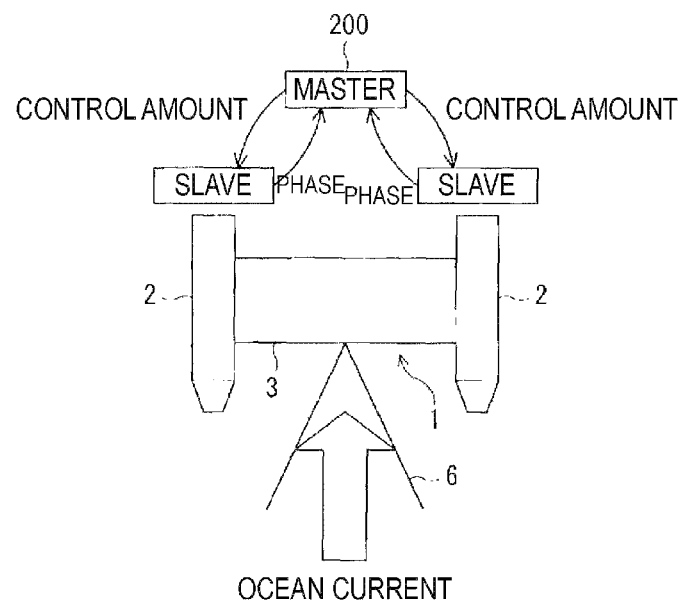
FIG. 13 is a drawing illustrating a control system of an underwater floating type ocean current power generation device according to a third embodiment.

In the present embodiment, as in the second embodiment, the rotational phases of the blades 5a are controlled so that the blades 5a of the rotary blade 5 of each of the left and right ocean current power generation device main bodies 2 synchronize and enter the shadow moment region of the shadow of the structure 3 and simultaneously cause reductions in the left and right thrust forces to occur. Thereby, the creation of moments is suppressed. Thus, functions of rotational phase control means are provided as moment suppression means. In the present embodiment, as illustrated in FIG. 13, both of the ocean current power generation device main bodies 2 are configured as slave devices and the master signal (control amount) is output from a separately provided master device 200. Thus, the blades 5a of the left and right ocean current power generation device main bodies 2 are controlled. In this configuration, the slave devices (the left and right ocean current power generation device main bodies 2) respond to the master signal by performing phase adjustments of the rotation angle of the blades 5a.

The master device 200 is provided with the same control unit 120 described in the second embodiment (see FIG. 9B) for the purpose of controlling each of the left and right ocean current power generation device main bodies 2. The control device 120 includes the angular phase difference computation unit 121, the angular phase difference determination unit 122, the synchronization hold control unit 123, the phase difference reduction control unit 124, and the drive train control unit 125 as functional constituents for each of the ocean current power generation device main bodies 2. Note that the control device 120 itself is not limited to being provided in the master device 200 and may be provided in the current power generation device main bodies 2.

A reference phase is stored in the master device 200. This reference phase serves as a reference for manipulating the rotational phase and the rotational speed (rotation speed) of the blades 5a (the rotary blade 5) of the current power generation device main bodies 2 of the slave devices. This reference phase is obtained by setting a target value of the rotation angle (phase) of the blades 5a in accordance with a time axis and, particularly, the reference phase is set on the basis of the target rotational speed of the rotor of the power generator 9. The target rotational speed of the rotor of the power generator 9 can be calculated from the ideal power generating state for efficiently obtaining power generating capacity.

Actions and Effects

The underwater floating type ocean current power generation device according to the third embodiment has the configuration described above. As such, the rotation of the blades 5a of the current power generation device main bodies 2 that are slave devices is controlled in the same manner as the slave device in the second embodiment, and the same actions and effects obtained in the second embodiment can be obtained. Note that the control of the blades 5a of the current power generation device main bodies 2 can be performed as illustrated in the flowchart of FIG. 11.

In the case of the present embodiment, the creation of moments can be suppressed even if a reduction in the thrust force occurs, the generation of cyclical vibration in the direction of the floating body 1 can be suppressed, and damage to the structure 13 of the floating body 1, the blades 5a, the mooring lines 6, and the like due to the generation of vibration is avoided. In addition, the reference phase for controlling the rotation of the blades 5a of the current power generation device main bodies 2 is set on the basis of the target rotational speed of the rotor of the power generator 9. Therefore, there is also an advantageous effect in that the power generator 9 can be configured in an ideal power generating state and power generating capacity can be efficiently obtained.

Other

The embodiments of the present invention are described above. The present invention may be appropriately modified or combined with one another without departing from the gist.

For example, in the second embodiment, the rotational phase of the blades 5a of the rotary blade 5 of the master device is set as the reference phase, but a configuration is possible in which the reference phase is set on the basis of the target rotational speed of the rotor of the power generator 9 (calculated from the ideal power generating state for efficiently obtaining power generating capacity) as in the third embodiment.

Additionally, in the first embodiment, reduction control of the thrust force is performed by controlling the rotational speed of the blades 5a by controlling the load torque $T_D$ of the drive train. However, if it is not necessary to consider maintainability and the like, a configuration is possible in which the blades 5a are configured with a variable pitch and the reduction control of the thrust force is performed by controlling the rotational speed of the blades 5a by changing the pitch.

Furthermore, in the first embodiment, the load torque $T_D$ of the drive train is controlled by the swash plate control of the hydraulic motor 114 of the hydraulic power transmission mechanism 108. However, control whereby load adjustment can be performed, other than swash plate control, may be applied to the hydraulic motor or, alternatively, the load torque $T_D$ of the drive train may be controlled by the power generation load torque of the power generator as in the first embodiment without relying on a hydraulic power transmission mechanism.

REFERENCE SIGNS LIST

1 Floating body (underwater floating-type ocean current power generation device)
2 Ocean current power generation device main body
3 Structure
4 Nacelle (pod)
5 Rotary blade
5A Main shaft (rotating shaft of rotary blade 5)
5a Blade
6 Mooring line
6A Anchor weight
7 Underwater
7a Ocean floor
8 Speed increaser
9 Power generator
10, 110 Drive train
20 Control device (thrust force reduction suppression means as moment suppression means)
21 Blade rotation area determination unit
22 Target rotation control unit
22a Load torque control unit
22b Thrust force computation unit
23 Rotation increase control unit
23a Reduced current velocity computation unit
23b Rotational speed computation unit
23c Load torque control unit
24 Drive train control unit
31, 31a, 31b Rotational speed sensor
32 Current velocity sensor
33, 33a, 33b Blade rotation angle sensor 34
34 Floating body rotation angle sensor
108 Hydraulic power transmission mechanism as speed increaser
111 Hydraulic circuit
112 Oil passage
113 Hydraulic pump
114 Hydraulic motor
115 On-off valve
116 Pressure sensor
120 Control device (rotational phase control means as moment suppression means)
121 Angular phase difference computation unit
122 Angular phase difference determination unit
123 Synchronization hold control unit
123a Load torque control unit
124 Phase difference reduction control unit
124a Slave rotational speed computation unit
124b Load torque control unit
125 Drive train control unit
$F_{th}$ Thrust force
$F_{wf}$ Acting force of ocean current
$F_b$ Buoyancy of floating body 1
$F_t$ Tension of mooring line 6
M Moment
$T_D$ Load torque
$T_{DT}$, $T_{DT1}$, $T_{DT2}$ Load torque target value
$U_C$ Current velocity of ocean current
$\omega$ Rotation speed (rotational speed) of blades 5a
$\omega_0$ Target rotation speed (target rotational speed)
$\omega'$ Thrust force reduction suppressing rotation speed (thrust force reduction suppressing rotational speed)
$\theta_B$ Rotation angle (phase angle) of blades 5a
$\theta_0$ to $\theta_1$ Rotation angle region corresponding to shadow moment region
$\theta_F$ Rotation angle of floating body 1

The invention claimed is:

1. An underwater floating type ocean current power generation device used in a state in which a middle portion of a structure is moored in an ocean floor by a mooring rope, the device comprising:
   ocean current power generation device main bodies, each including a rotor of a power generator housed inside a nacelle; and
   the structure;
      the rotor being configured to be driven by a rotary blade protruding outward from the nacelle;
      a floating body utilizing a twin drum model and capable of floating underwater being constituted by the structure and the ocean current power generation device main bodies joined to the left and right of the structure;
      wherein
      each of the ocean current power generation device main bodies uses a downwind system in which the rotary blade is disposed farther to a downstream side in an ocean current direction than the nacelle;
      each of the ocean current power generation device main bodies includes moment suppression means configured to suppress moments that are created in the floating body as a result of a reduction in thrust force accompanying reduced current velocity of ocean current that occurs when a blade of the rotary blade enters a shadow region of the structure on an upstream side in the ocean current direction; and
      wherein:
         the moment suppression means is thrust force reduction suppression means configured to suppress reductions in the thrust force of the ocean current that occur when the blade enters the shadow region of the structure.

2. The underwater floating type ocean current power generation device according to claim 1, wherein:
   the thrust force reduction suppression means is configured to suppress reductions in the thrust force by an increased rotational speed of the rotary blade in accordance with reduced current velocity of ocean current that occurs when the blade enters the shadow region of the structure.

3. An underwater floating type ocean current power generation device used in a state in which a middle portion of a structure is moored in an ocean floor by a mooring rope, the device comprising:
   ocean current power generation device main bodies, each including a rotor of a power generator housed inside a nacelle; and
   the structure;
      the rotor being configured to be driven by a rotary blade protruding outward from the nacelle:
      a floating body utilizing a twin drum model and capable of floating underwater being constituted by the structure and the ocean current power generation device main bodies joined to the left and right of the structure;
      wherein
      each of the ocean current power generation device main bodies uses a downwind system in which the rotary blade is disposed farther to a downstream side in an ocean current direction than the nacelle; and
      each of the ocean current power generation device main bodies includes moment suppression means configured to suppress moments that are created in the floating body as a result of a reduction in thrust force accompanying reduced current velocity of ocean current that occurs when a blade of the rotary blade enters a shadow region of the structure on an upstream side in the ocean current direction, wherein:
         the moment suppression means is rotational phase control means configured to control a rotational phase of the blade so that the blade of the rotary blade of each of the ocean current power generation device main bodies joined to the left and right of the structure synchronizes and enters the shadow region of the structure.

4. The underwater floating type ocean current power generation device according to claim 3, wherein:
   the rotational phase control means is configured to control the rotational phase of the blade so that the rotational phase of the blade of the rotary blade of one of the ocean current power generation device main bodies joined to the left and right of the structure is set as a reference phase; and
   the rotational phase of the blade of the rotary blade of the other ocean current power generation device main body of the ocean current power generation device main bodies conforms to and synchronizes with the reference phase.

5. The underwater floating type ocean current power generation device according to claim 3, wherein:
   the rotational phase control means is configured to control the rotational phase of the blade of the rotary blade of each of the ocean current power generation device main bodies joined to the left and right of the structure on the basis of a preset reference phase.

6. The underwater floating type ocean current power generation device according to claim 4, wherein:

the reference phase is set on the basis of a target rotational speed of the rotor of the power generator.

7. The underwater floating type ocean current power generation device according to claim 2, wherein:
the thrust force reduction suppression means include:
a blade rotation area determination unit configured to determine whether or not the blade has entered the shadow region of the structure;
a target rotation control unit configured to, in cases where the blade has not entered the shadow region of the structure, control a rotational speed of the blade to a target rotational speed; and
a rotation increase control unit configured to, in cases where the blade has entered the shadow region of the structure, set a thrust force reduction suppression rotational speed of the blade that is rotationally increased and capable of suppressing reductions in the thrust force caused by reduced current velocity of the ocean current, and control the rotational speed of the blade to the thrust force reduction suppression rotational speed.

8. The underwater floating type ocean current power generation device according to claim 6, wherein:
the rotational phase control means include:
an angular phase difference computation unit configured to calculate a phase difference between the reference phase and a rotational phase of the blade subject to control;
an angular phase difference determination unit configured to determine, from the phase difference that is calculated, whether or not the rotational phase of the blade subject to control is in a synchronized state with the reference phase;
a synchronization hold control unit configured to hold the synchronized state when determined to be in the synchronized state; and
a phase difference reduction control unit configured to perform control and reduce the phase difference to a phase difference indicating the synchronized state when determined not to be in the synchronized state.

9. The underwater floating type ocean current power generation device according to claim 5, wherein:
the reference phase is set on the basis of a target rotational speed of the rotor of the power generator.

10. A control method for an underwater floating type ocean current power generation device used in a state in which a middle portion of the left and right of a structure is moored in an ocean floor by a mooring rope,
the device comprising:
ocean current power generation device main bodies, each including a rotor of a power generator housed inside a nacelle; and
the structure;
the rotor being configured to be driven by a rotary blade protruding outward from the nacelle;
a floating body utilizing a twin drum model capable of floating underwater being constituted by the structure and the ocean current power generation device main bodies joined to the left and right of the structure;
each of the ocean current power generation device main bodies using a downwind system in which the rotary blade is disposed farther to a downstream side in an ocean current direction than the nacelle;
the method comprising:
performing moment suppression processing to suppress moments that are created in the floating body as a result of a reduction in thrust force accompanying reduced current velocity of ocean current that occurs in a shadow region of the structure when a blade of the rotary blade enters the shadow region of the structure on an upstream side in the ocean current direction; wherein:
the moment suppression processing is performed by suppressing reductions in the thrust force of the ocean current in the shadow region that occur when the blade enters the shadow region of the structure.

11. The control method for an underwater floating type ocean current power generation device according to claim 10, wherein:
the suppressing of reductions in the thrust force is performed by increasing a rotational speed of the rotary blade in accordance with the reduced current velocity of the ocean current in the shadow region that occurs when the blade enters the shadow region of the structure.

12. A control method for an underwater floating type ocean current power generation device used in a state in which a middle portion of a structure is moored in an ocean floor by a mooring rope,
the device comprising:
ocean current power generation device main bodies, each including a rotor of a power generator housed inside a nacelle; and
the structure;
the rotor being configured to be driven by a rotary blade protruding outward from the nacelle:
a floating body utilizing a twin drum model capable of floating underwater being constituted by the structure and the ocean current power generation device main bodies joined to the left and right of the structure;
each of the ocean current power generation device main bodies using a downwind system in which the rotary blade is disposed farther to a downstream side in an ocean current direction than the nacelle;
the method comprising:
performing moment suppression processing to suppress moments that are created in the floating body as a result of a reduction in thrust force accompanying reduced current velocity of ocean current that occurs in a shadow region of the structure when a blade of the rotary blade enters the shadow region of the structure on an upstream side in the ocean current direction, wherein:
the moment suppression processing is performed by controlling a rotational phase of the blade so that the blade of the rotary blade of each of the ocean current power generation device main bodies joined to the left and right of the structure synchronize and enter the shadow region of the structure.

13. The control method for an underwater floating type ocean current power generation device according to claim 12, wherein:
the controlling of the rotational phase is performed by setting the rotational phase of the blade of the rotary blade of one of the ocean current power generation device main bodies joined to the left and right of the structure as a reference phase, and conforming and synchronizing the rotational phase of the blade of the rotary blade of the other ocean current power generation device main body of the ocean current power generation device main bodies with the reference phase.

14. The control method for an underwater floating type ocean current power generation device according to claim 12, wherein:
the controlling of the rotational phase is performed by controlling the rotational phase of the blade of the rotary blade of each of the ocean current power generation device main bodies joined to the left and right of the structure on the basis of a preset reference phase.

15. The control method for an underwater floating type ocean current power generation device according to claim 13, wherein:
the reference phase is set on the basis of a target rotational speed of the rotor of the power generator.

16. The control method for an underwater floating type ocean current power generation device according to claim 11, wherein:
the suppressing of reductions in the thrust force includes:
determining whether or not the blade has entered the shadow region of the structure; and
when it is determined that the blade has not entered the shadow region of the structure, controlling a rotational speed of the blade to a target rotational speed; and
when it is determined that the blade has entered the shadow region of the structure, setting a thrust force reduction suppression rotational speed of the blade that is rotationally increased and capable of suppressing reductions in the thrust force caused by reduced current velocity of the ocean current, and controlling the rotational speed of the blade to the thrust force reduction suppression rotational speed.

17. The control method for an underwater floating type ocean current power generation device according to claim 15, wherein:
the controlling of the rotational phase includes:
calculating a phase difference between the reference phase and a rotational phase of the blade subject to control;
determining, from the phase difference that is calculated, whether or not the rotational phase of the blade subject to control is in a synchronized state with the reference phase;
holding the synchronized state when determined to be in the synchronized state; and performing control and reducing the phase difference to a phase difference indicating the synchronized state when determined not to be in the synchronized state.

18. The control method for an underwater floating type ocean current power generation device according to claim 14, wherein:
the reference phase is set on the basis of a target rotational speed of the rotor of the power generator.

* * * * *